(12) United States Patent
Cho et al.

(10) Patent No.: US 10,235,030 B2
(45) Date of Patent: Mar. 19, 2019

(54) ELECTRONIC DEVICE AND USER INTERFACE DISPLAY METHOD FOR THE SAME

(71) Applicant: Samsung Electronics Co., Ltd., Gyeonggi-do (KR)

(72) Inventors: Eunbee Cho, Seoul (KR); Eunyoung Kim, Seoul (KR); Jaeho Ko, Seoul (KR); Boosun Shin, Seoul (KR)

(73) Assignee: Samsung Electronics Co., Ltd (KR)

( * ) Notice: Subject to any disclaimer, the term of this patent is extended or adjusted under 35 U.S.C. 154(b) by 197 days.

(21) Appl. No.: 15/114,031

(22) PCT Filed: Jan. 22, 2015

(86) PCT No.: PCT/KR2015/000664
§ 371 (c)(1),
(2) Date: Jul. 25, 2016

(87) PCT Pub. No.: WO2015/111926
PCT Pub. Date: Jul. 30, 2015

(65) Prior Publication Data
US 2016/0342316 A1  Nov. 24, 2016

(30) Foreign Application Priority Data

Jan. 23, 2014 (KR) .................. 10-2014-0008075

(51) Int. Cl.
G06F 17/30 (2006.01)
G06F 3/0482 (2013.01)
G06F 3/0484 (2013.01)
G06F 3/0481 (2013.01)
G06F 3/0488 (2013.01)

(52) U.S. Cl.
CPC ........ *G06F 3/04845* (2013.01); *G06F 3/0482* (2013.01); *G06F 3/04812* (2013.01); *G06F 3/04817* (2013.01); *G06F 3/04842* (2013.01); *G06F 3/04883* (2013.01); *G06F 17/30106* (2013.01); *G06F 2203/04806* (2013.01)

(58) Field of Classification Search
CPC .............................. G06F 9/45; G06F 3/04817
USPC ................................. 715/718, 762, 765, 815
See application file for complete search history.

(56) References Cited

U.S. PATENT DOCUMENTS

| | | | |
|---|---|---|---|
| 2007/0209022 A1* | 9/2007 | Gourdol | G06F 9/451 715/815 |
| 2010/0332431 A1 | 12/2010 | Ribiere et al. | |
| 2011/0009103 A1 | 1/2011 | Do | |
| 2011/0161308 A1* | 6/2011 | Andersen | G06F 17/30867 707/707 |
| 2013/0091450 A1 | 4/2013 | Yi et al. | |

(Continued)

OTHER PUBLICATIONS

PCT/ISA/210 Search Report issued on PCT/KR2015/000664 (pp. 3).

(Continued)

*Primary Examiner* — Cao H Nguyen
(74) *Attorney, Agent, or Firm* — The Farrell Law Firm, P.C.

(57) ABSTRACT

A user interface display method is provided that displays electronic documents and/or items on a list on an electronic device. The method includes: displaying one or more images; obtaining preference information; and altering the images according to the preference information and displaying the altered images.

22 Claims, 37 Drawing Sheets

(56) References Cited

U.S. PATENT DOCUMENTS

2013/0117161 A1  5/2013 Waidmann et al.
2013/0124539 A1  5/2013 Lin et al.
2013/0159900 A1  6/2013 Pendharkar
2013/0305187 A1  11/2013 Phillips et al.

OTHER PUBLICATIONS

PCT/ISA/237 Written Opinion issued on PCT/KR2015/000664 (pp. 7).
European Search Report dated Sep. 21, 2017 issued in counterpart application No. 15740844.4-1879, 9 pages.

* cited by examiner

[Fig. 1]
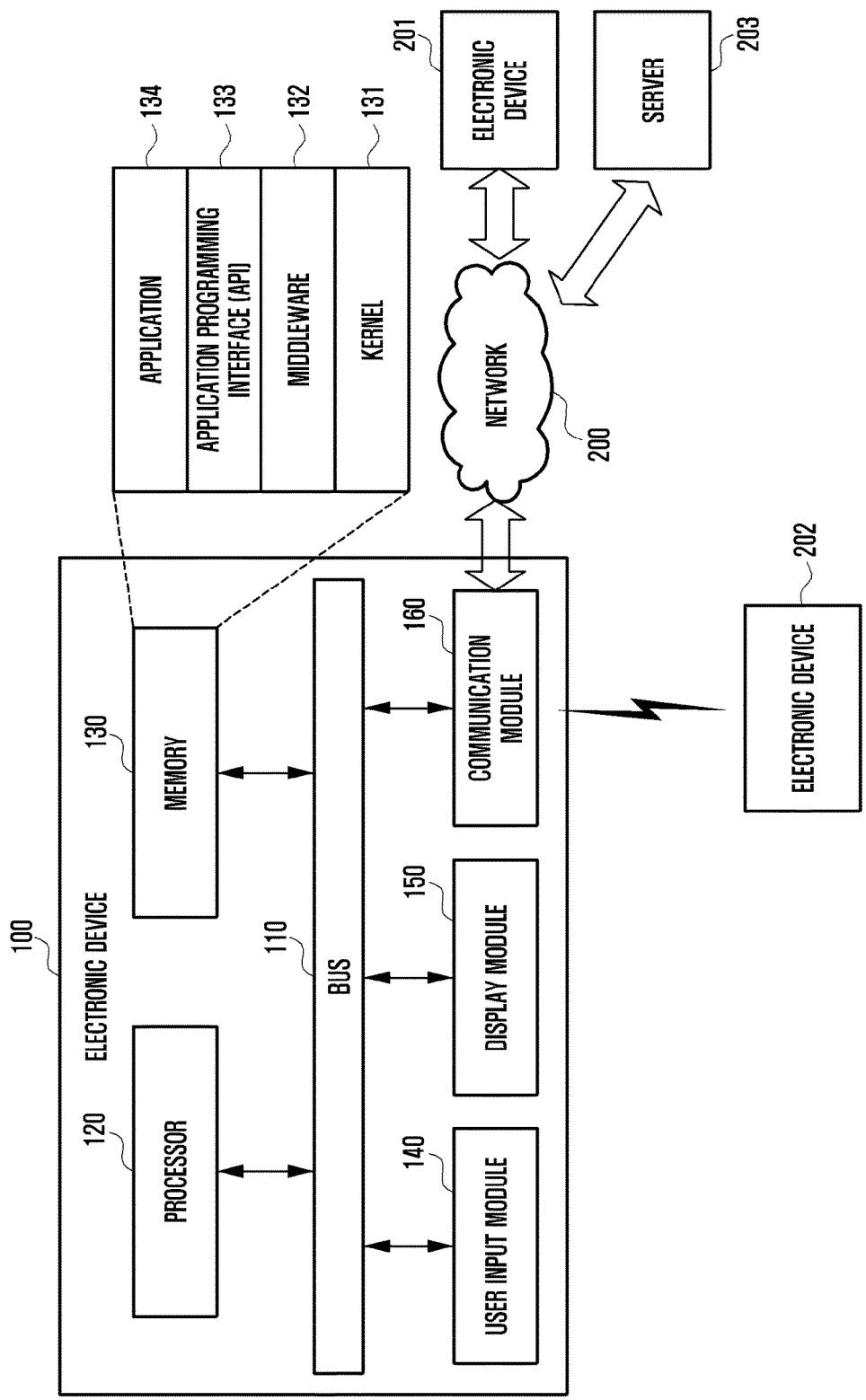

[Fig. 2]
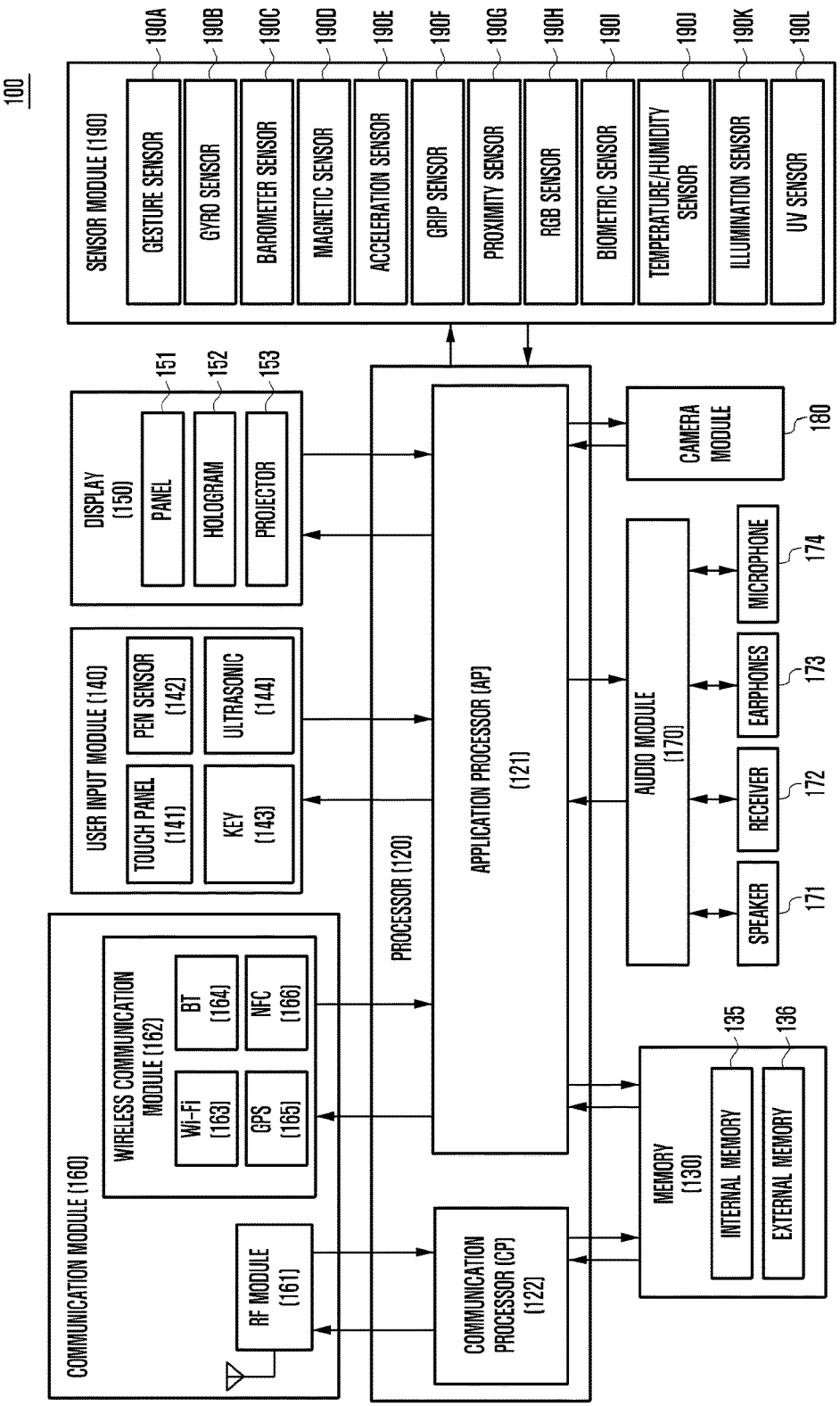

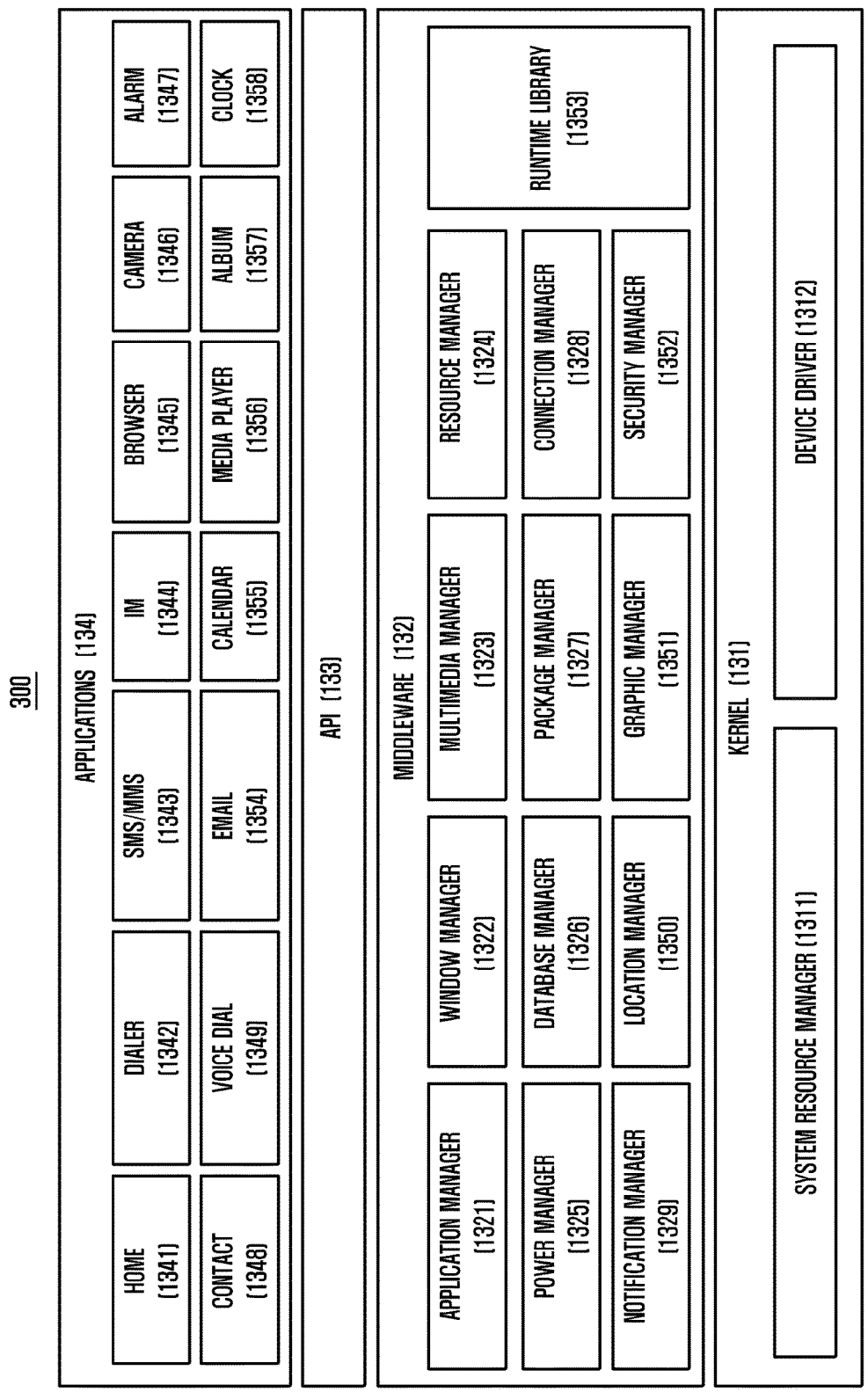

[Fig. 4]
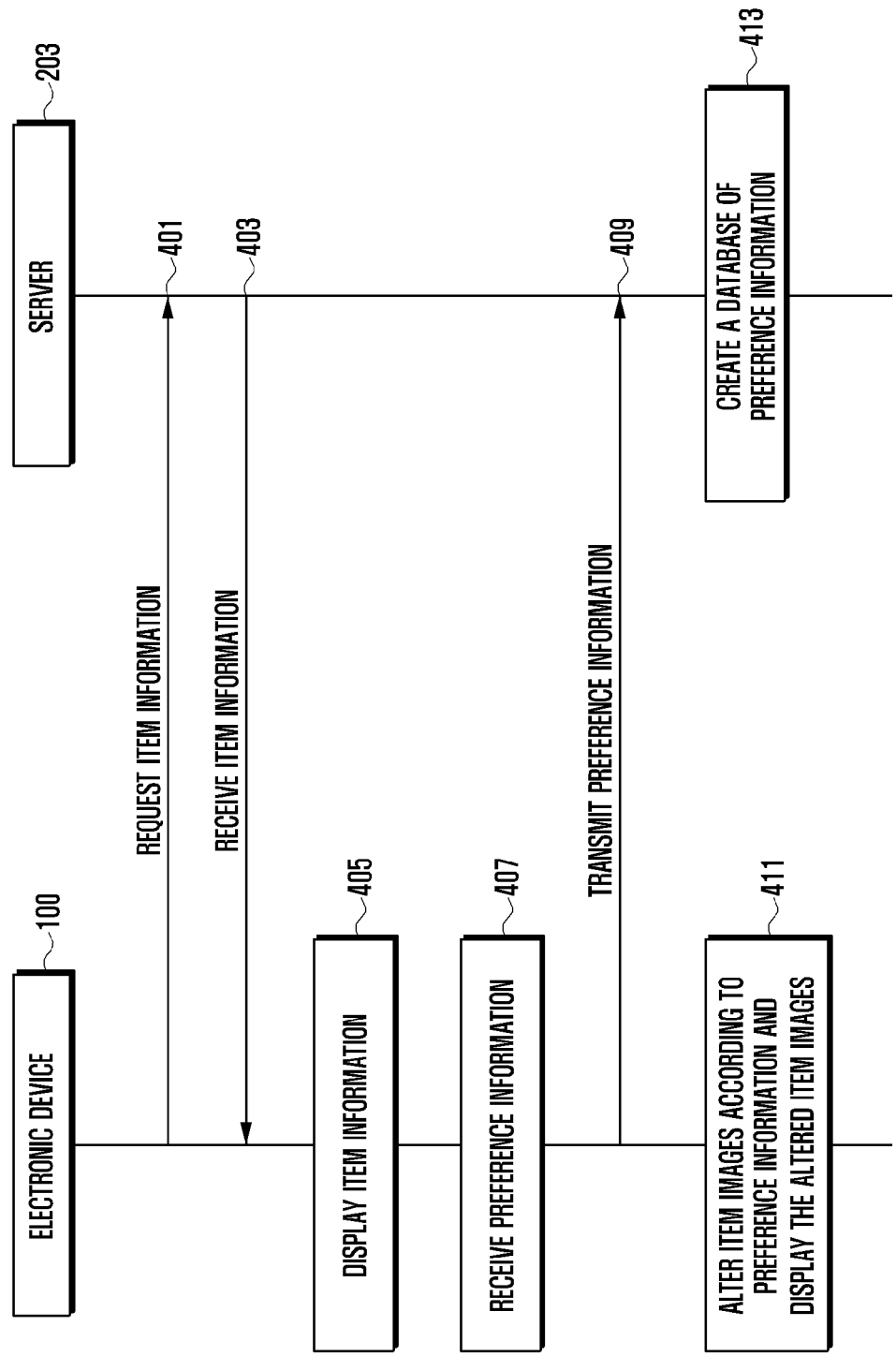

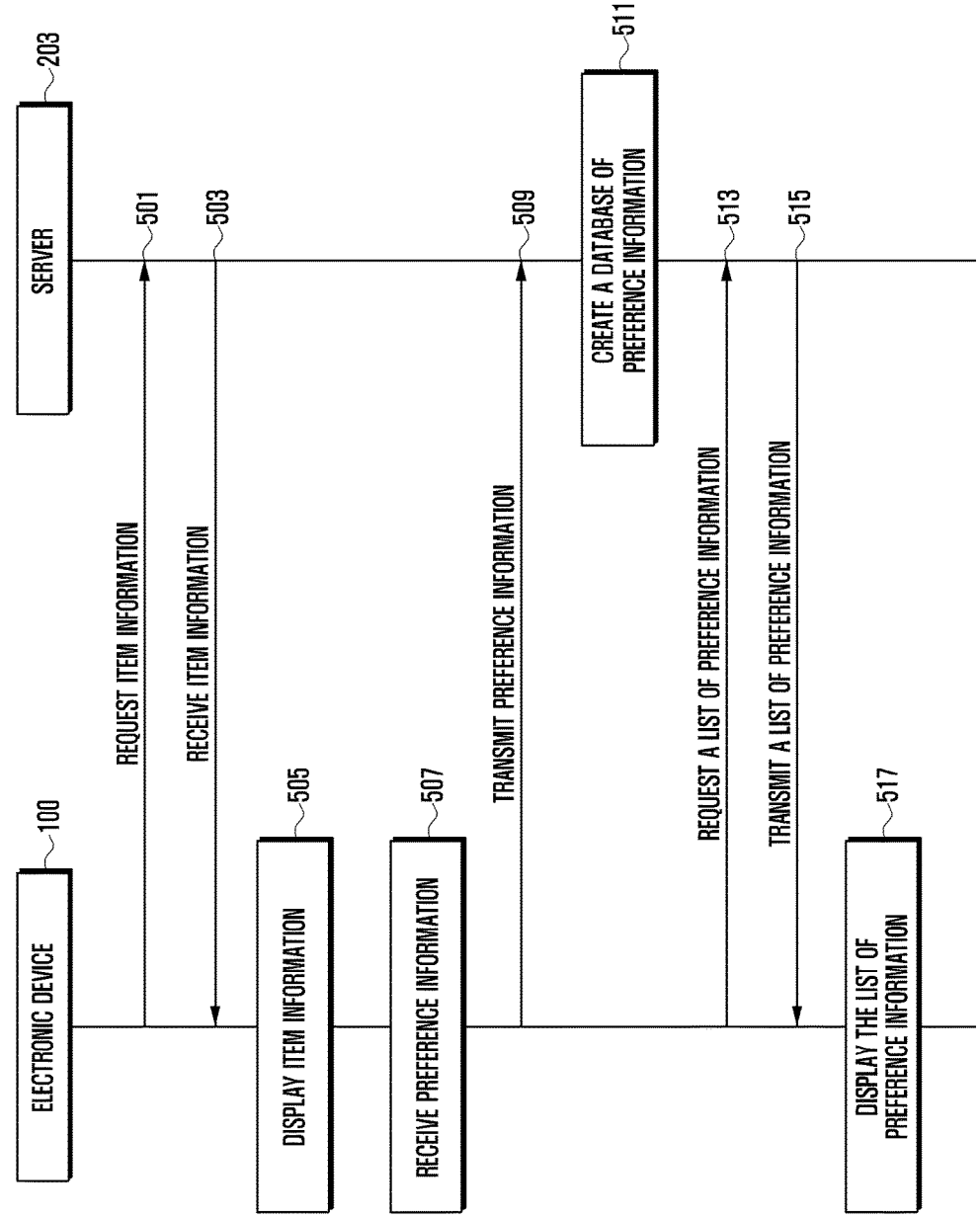
[Fig. 5]

[Fig. 6]
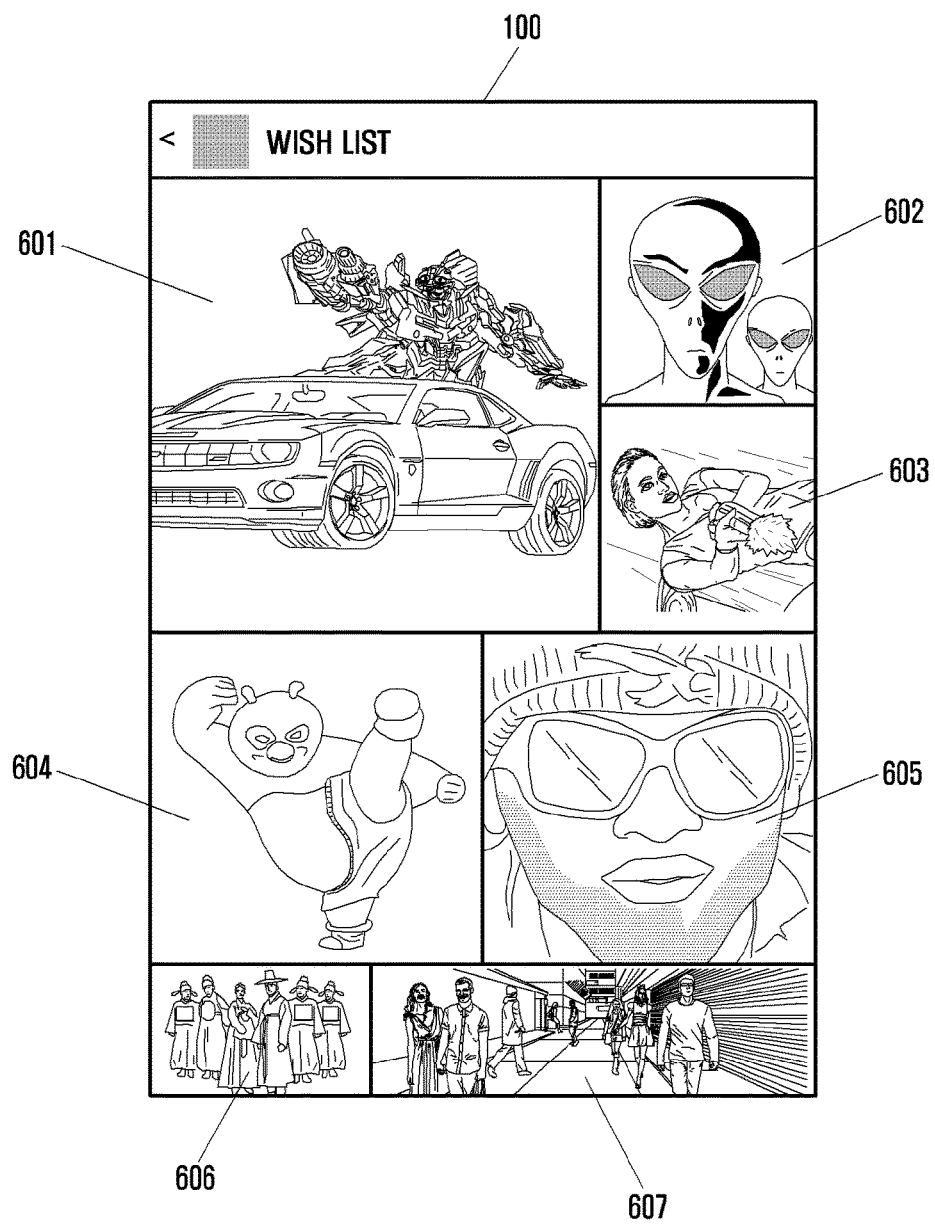

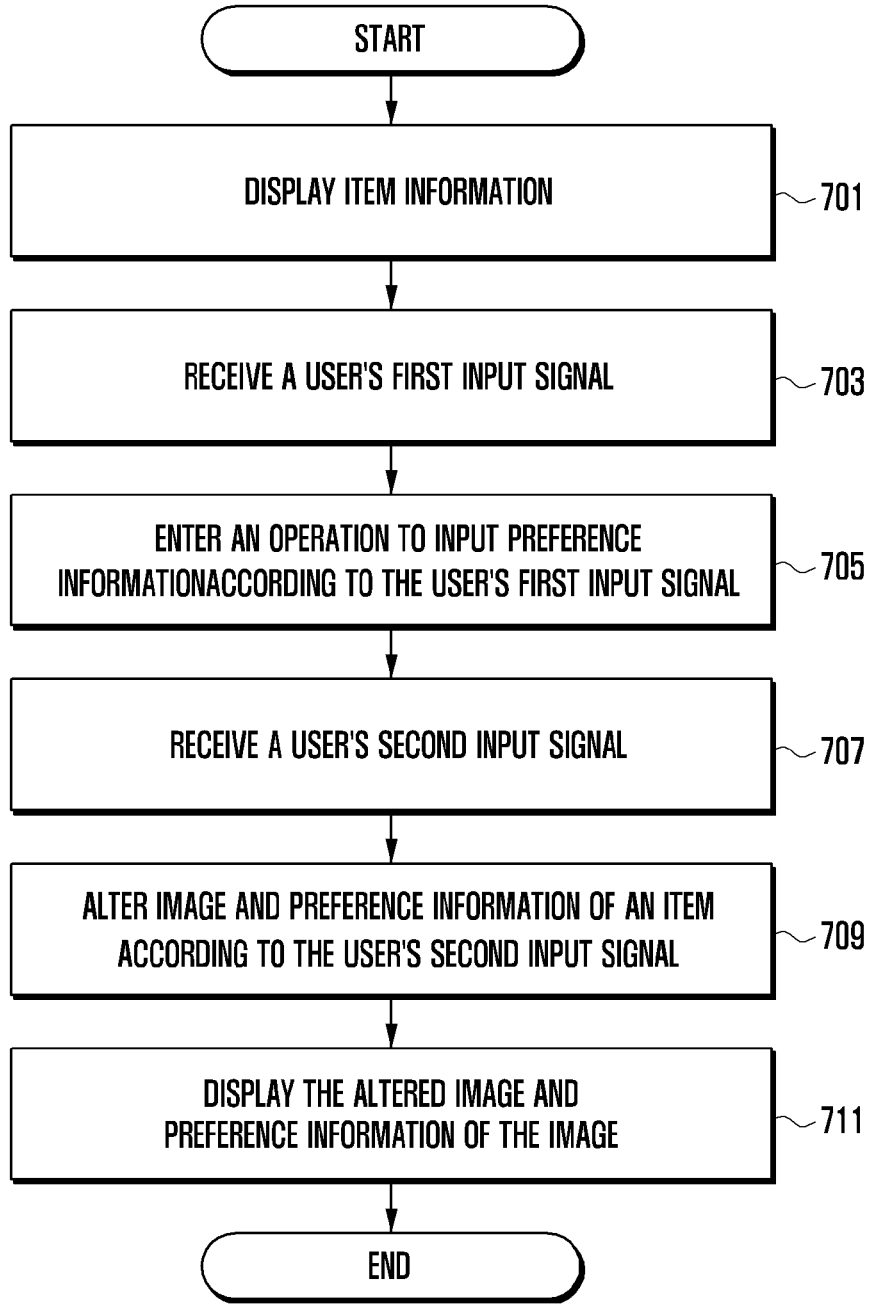
[Fig. 7]

[Fig. 8a]
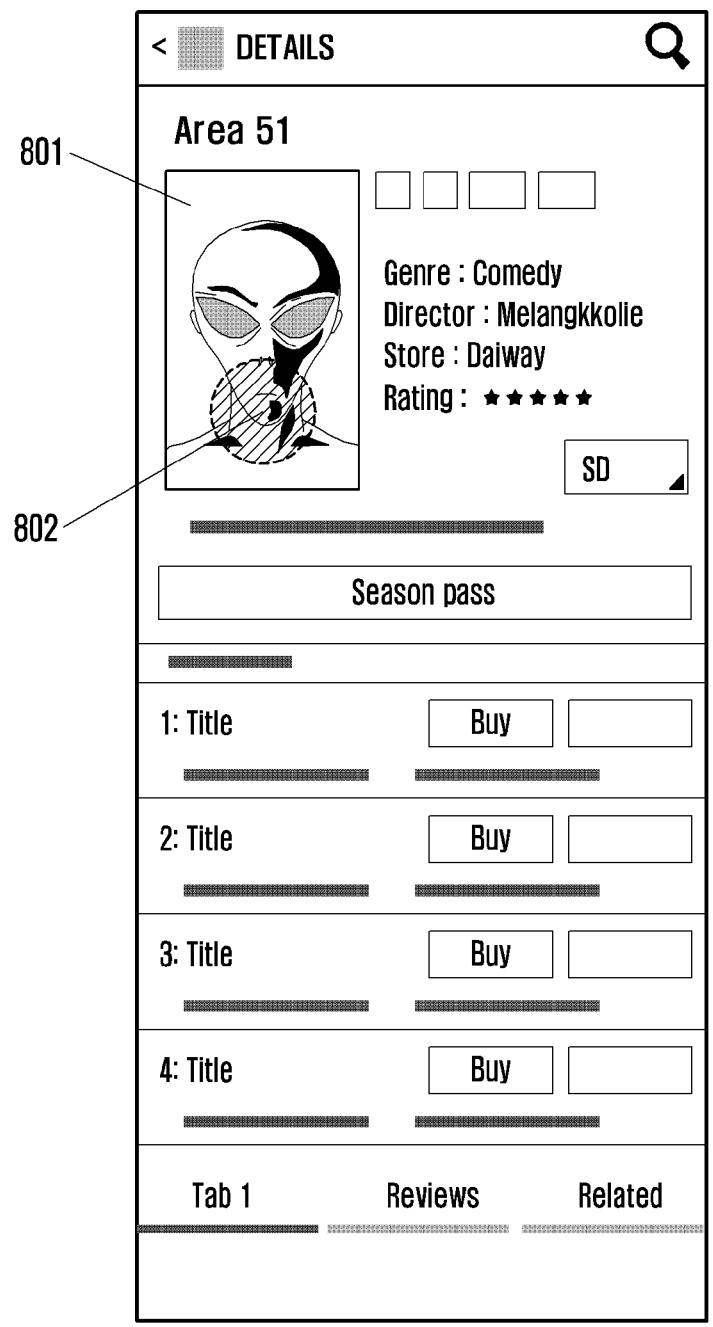

[Fig. 8b]
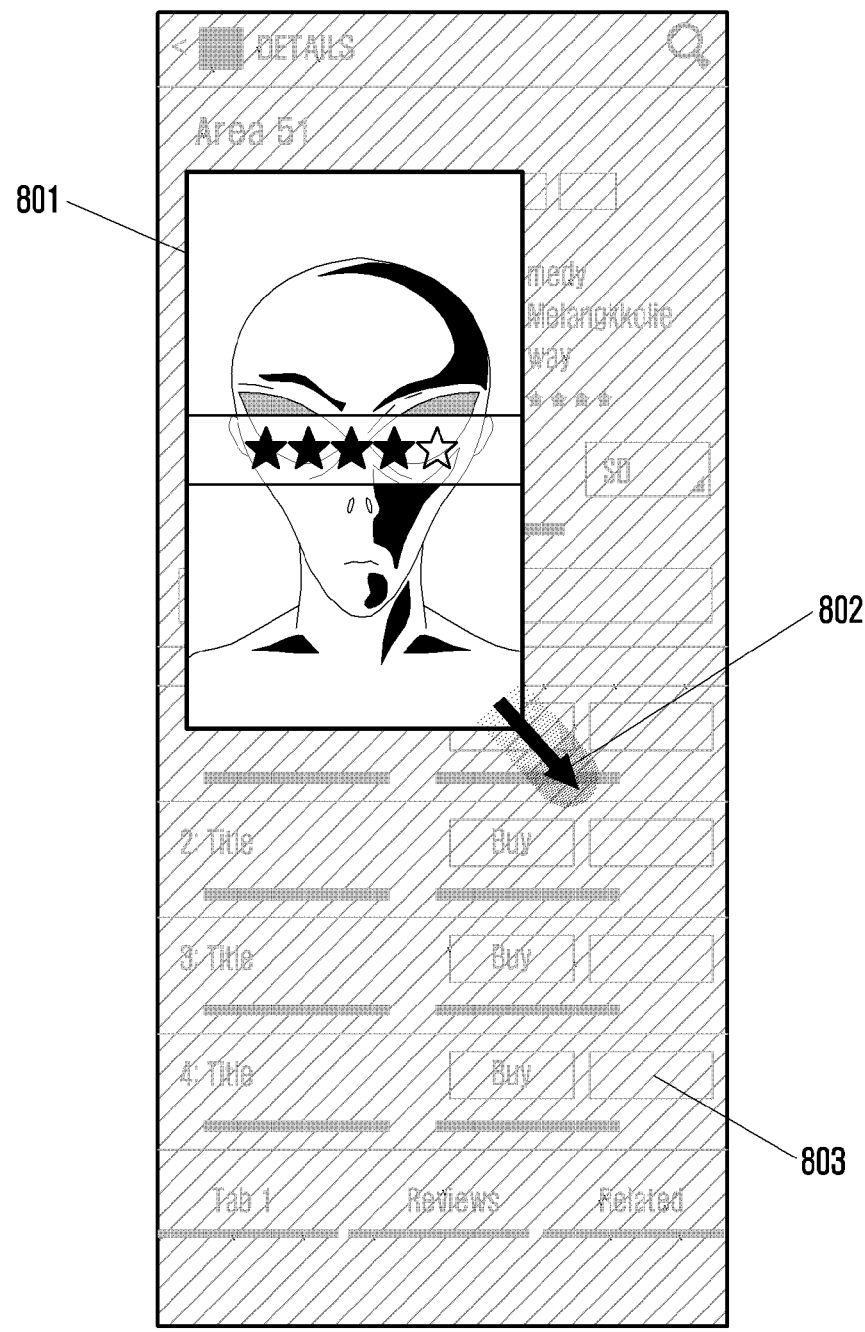

[Fig. 8c]
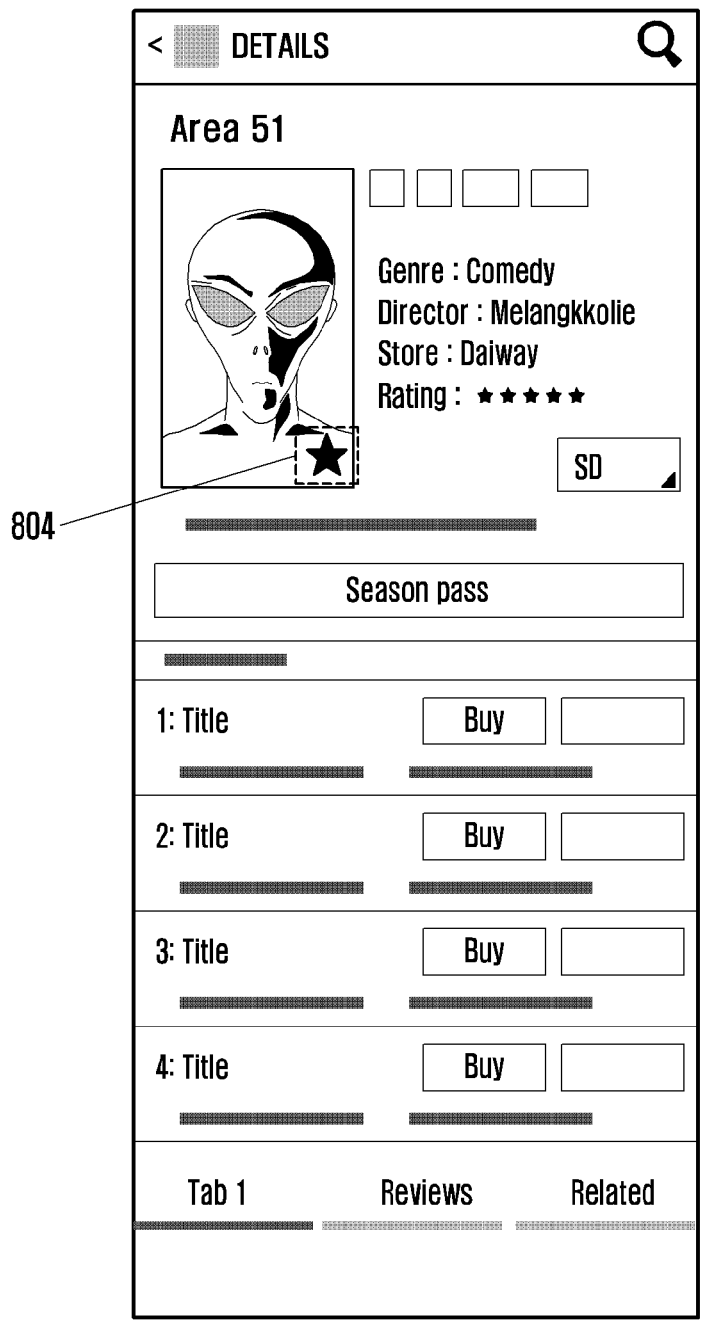

[Fig. 9]
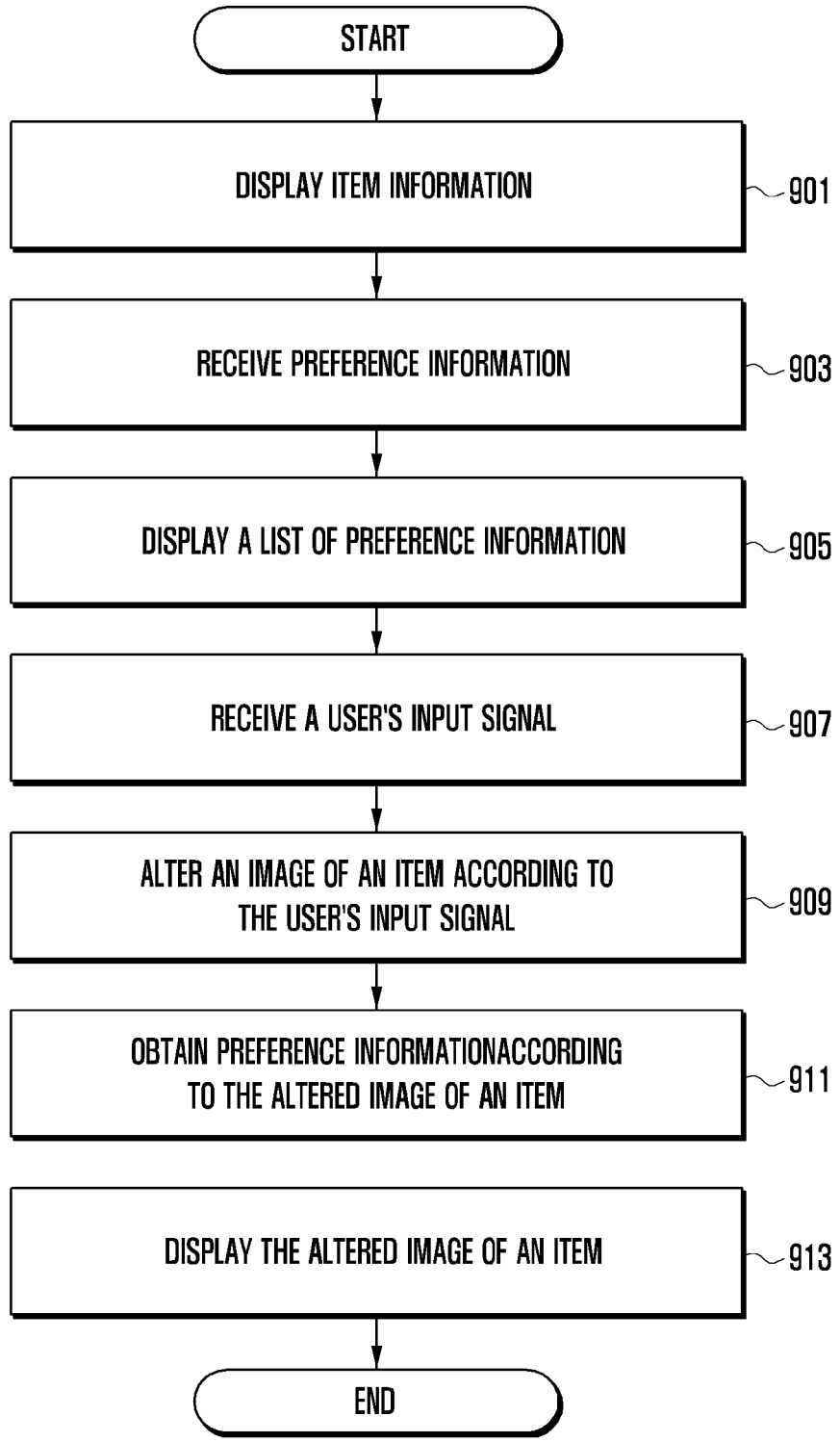

[Fig. 10a]
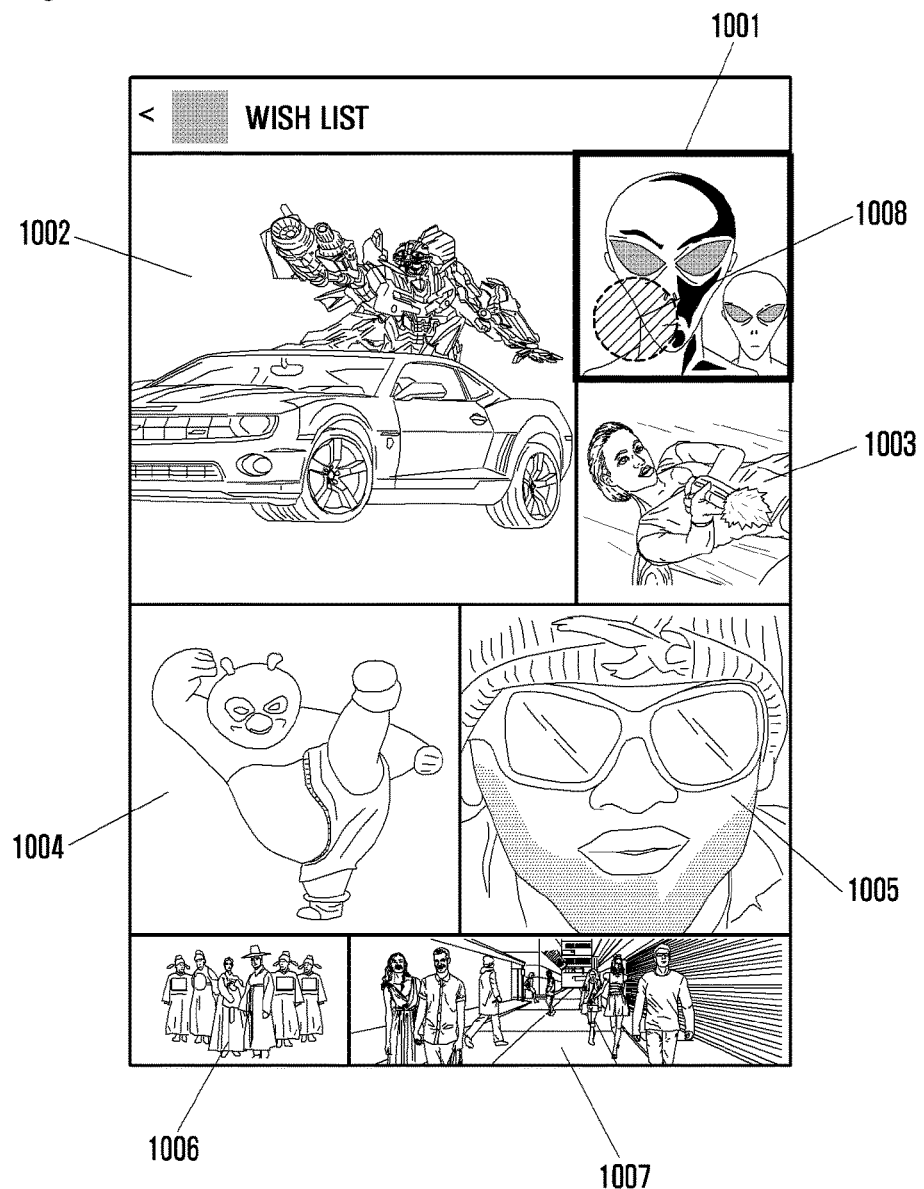

[Fig. 10b]
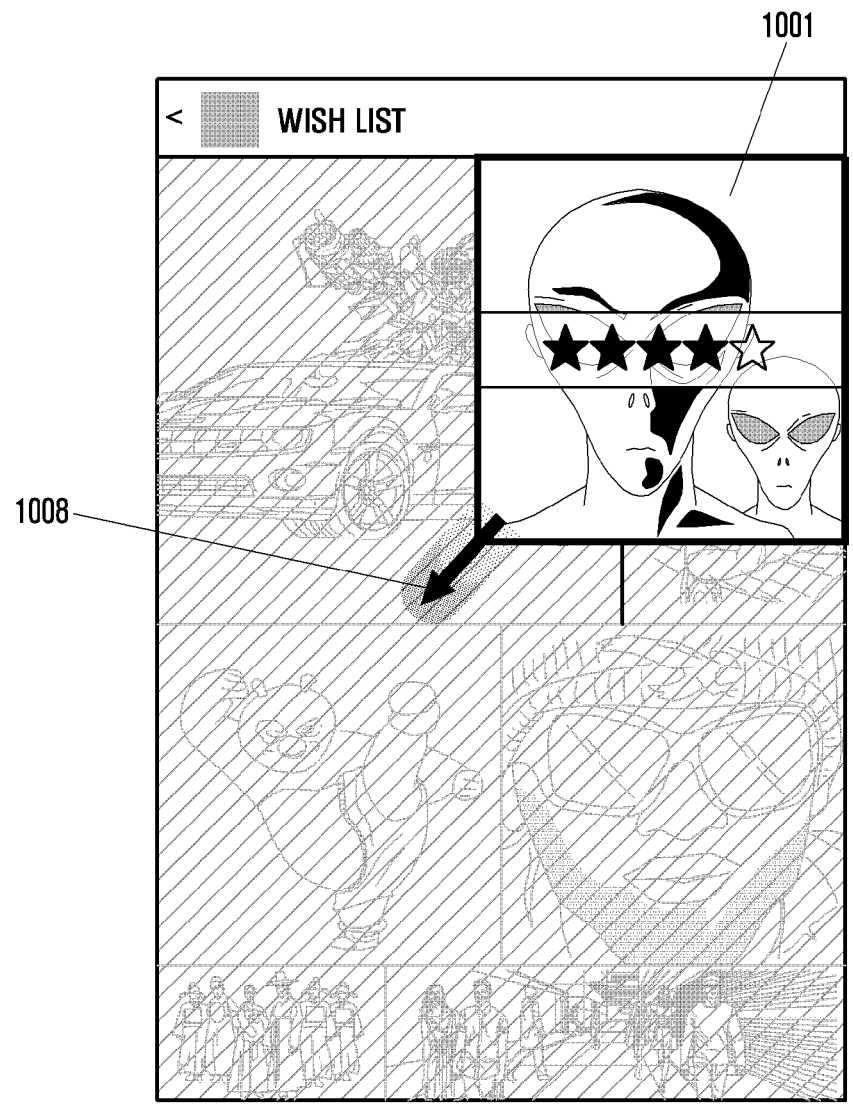

[Fig. 10c]
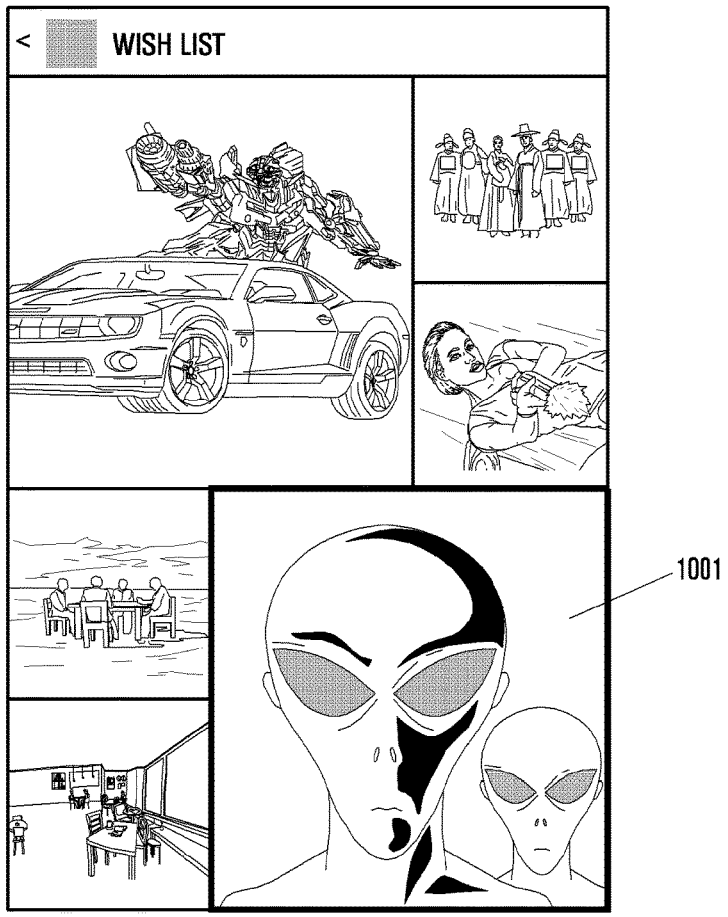
[Fig. 11]
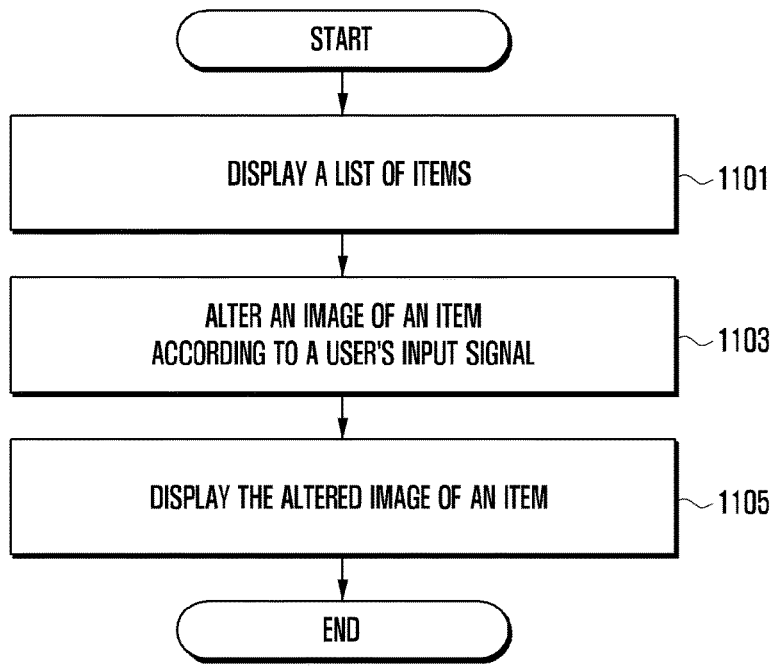

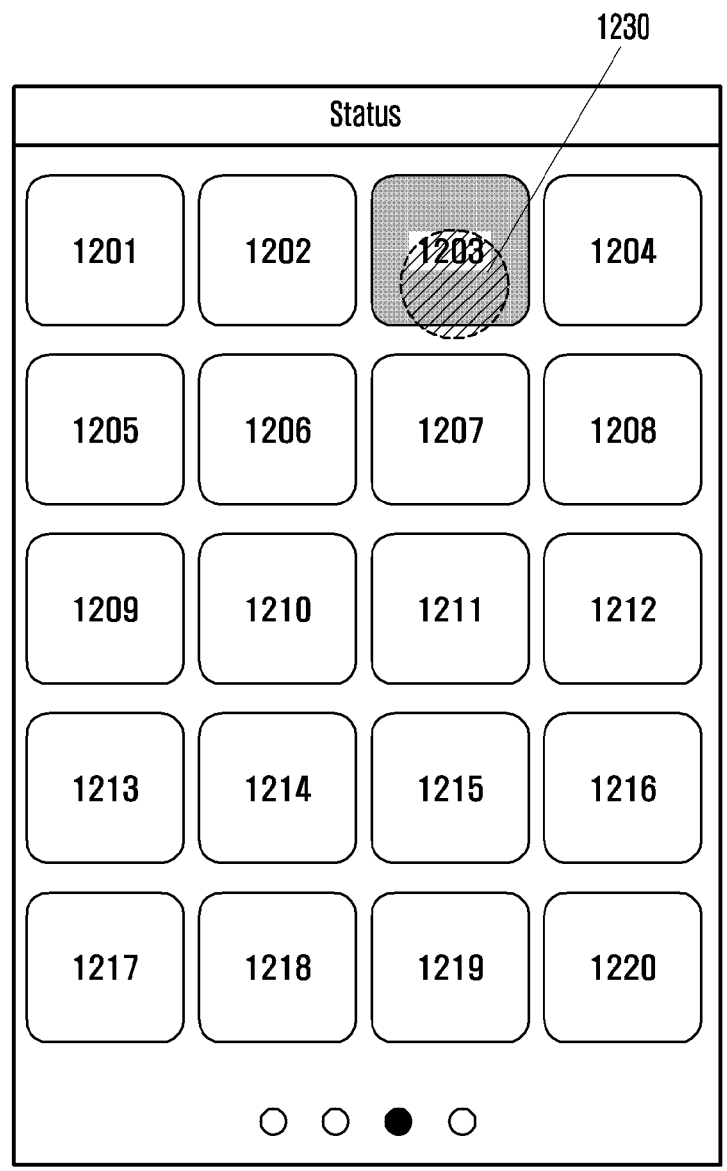
[Fig. 12a]

[Fig. 12b]
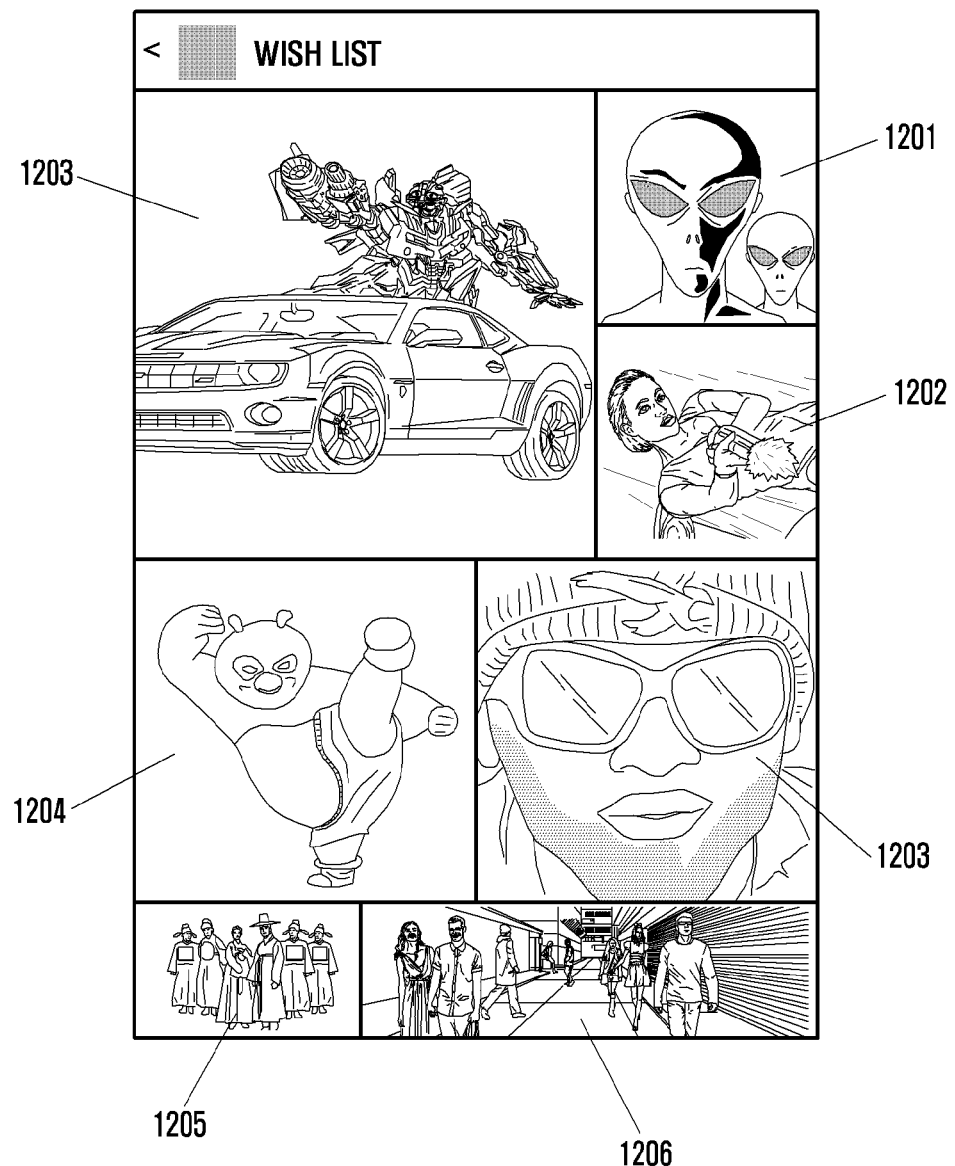

[Fig. 13]
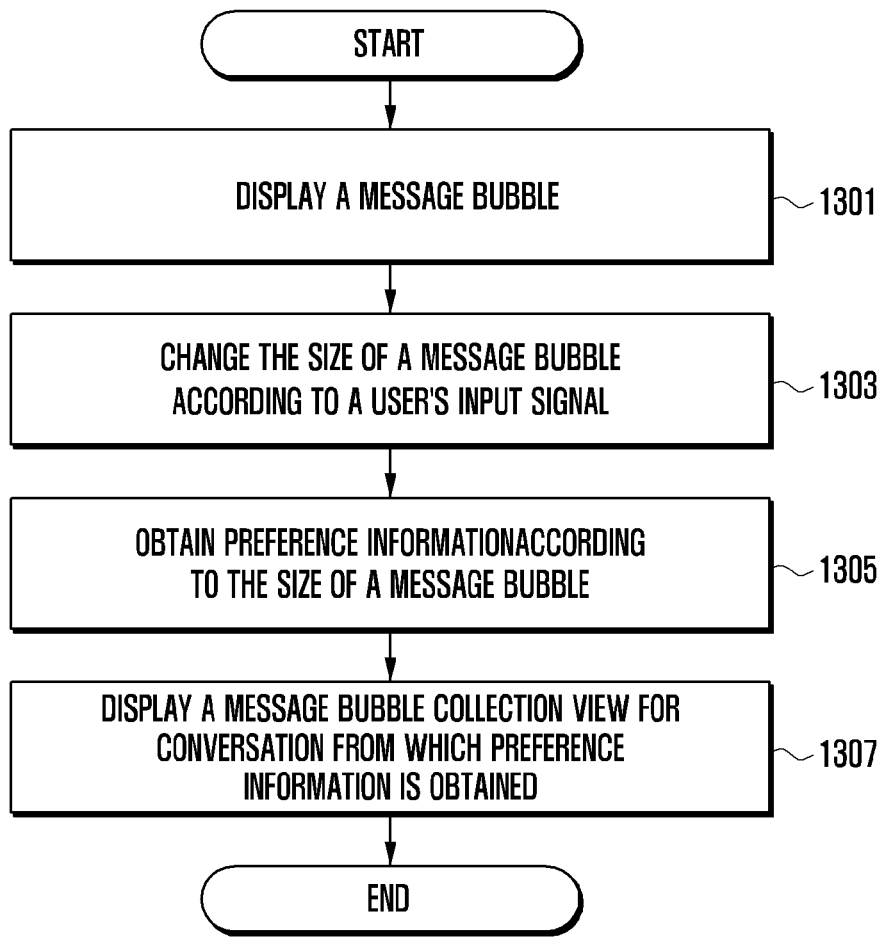

[Fig. 14a]
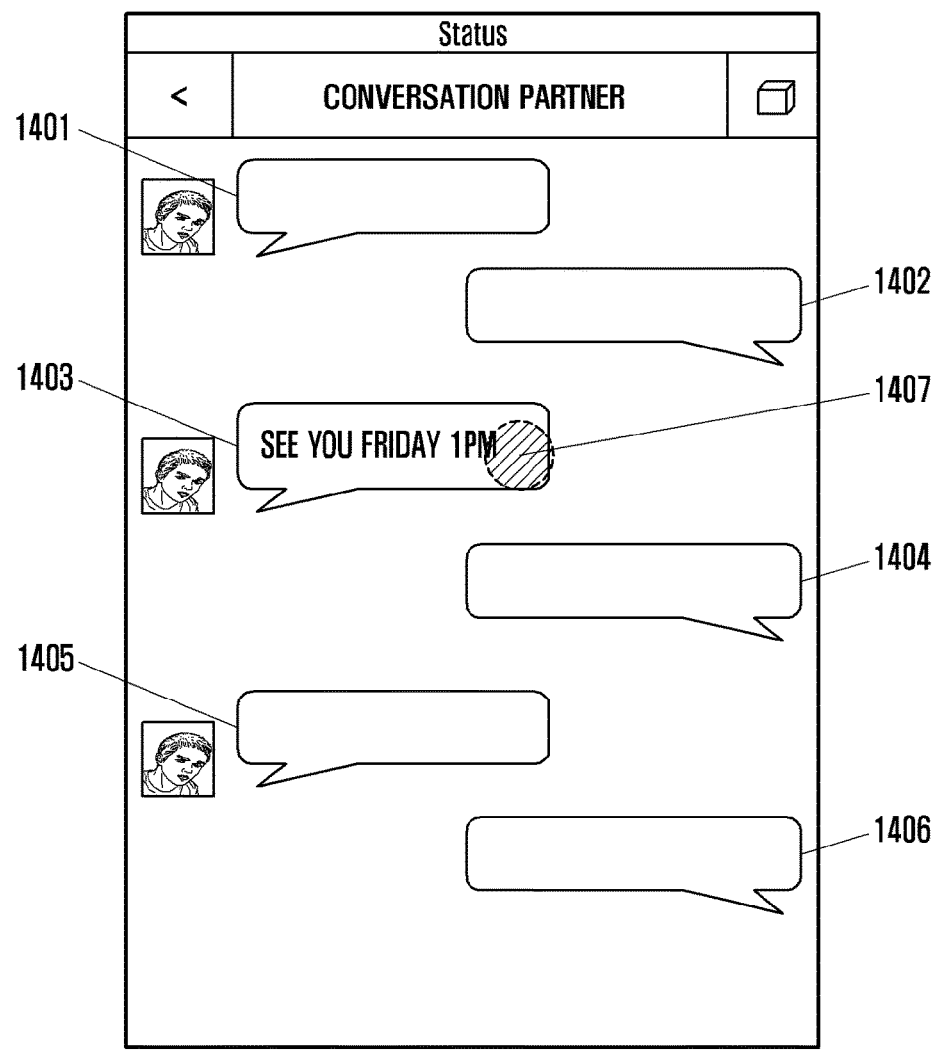

[Fig. 14b]
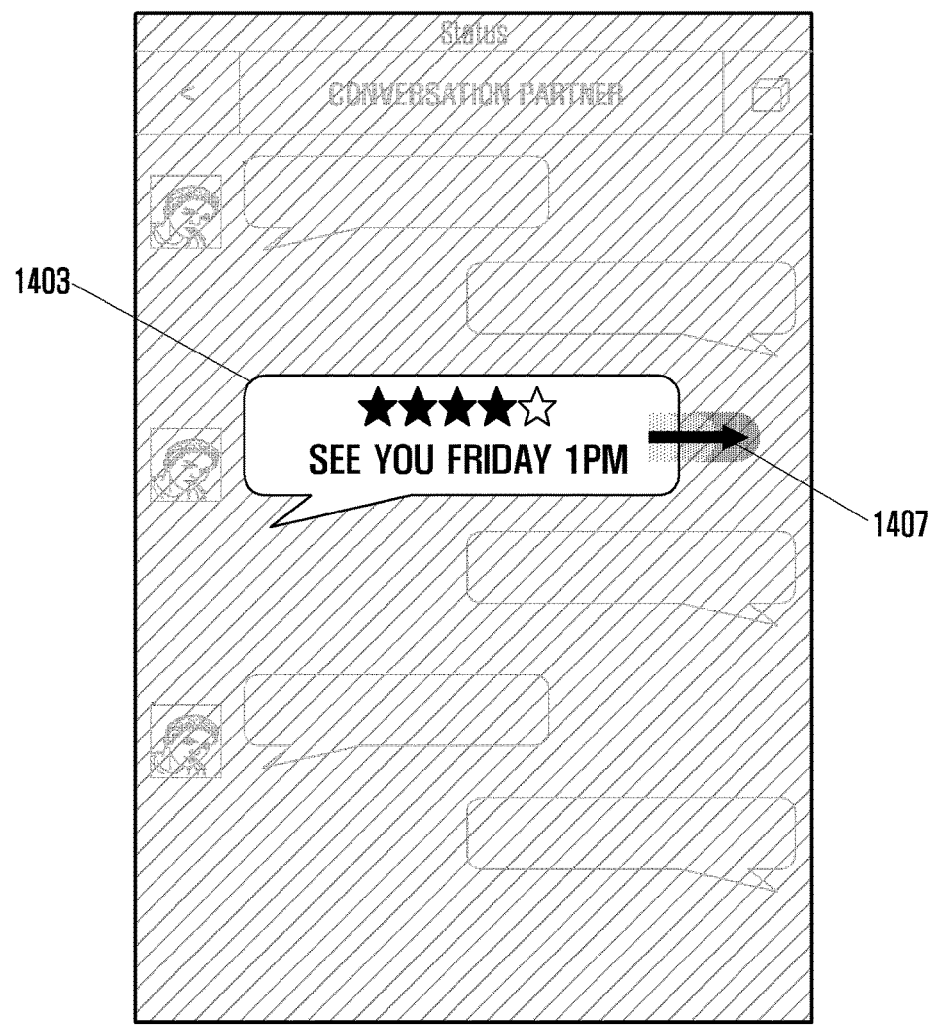

[Fig. 14c]
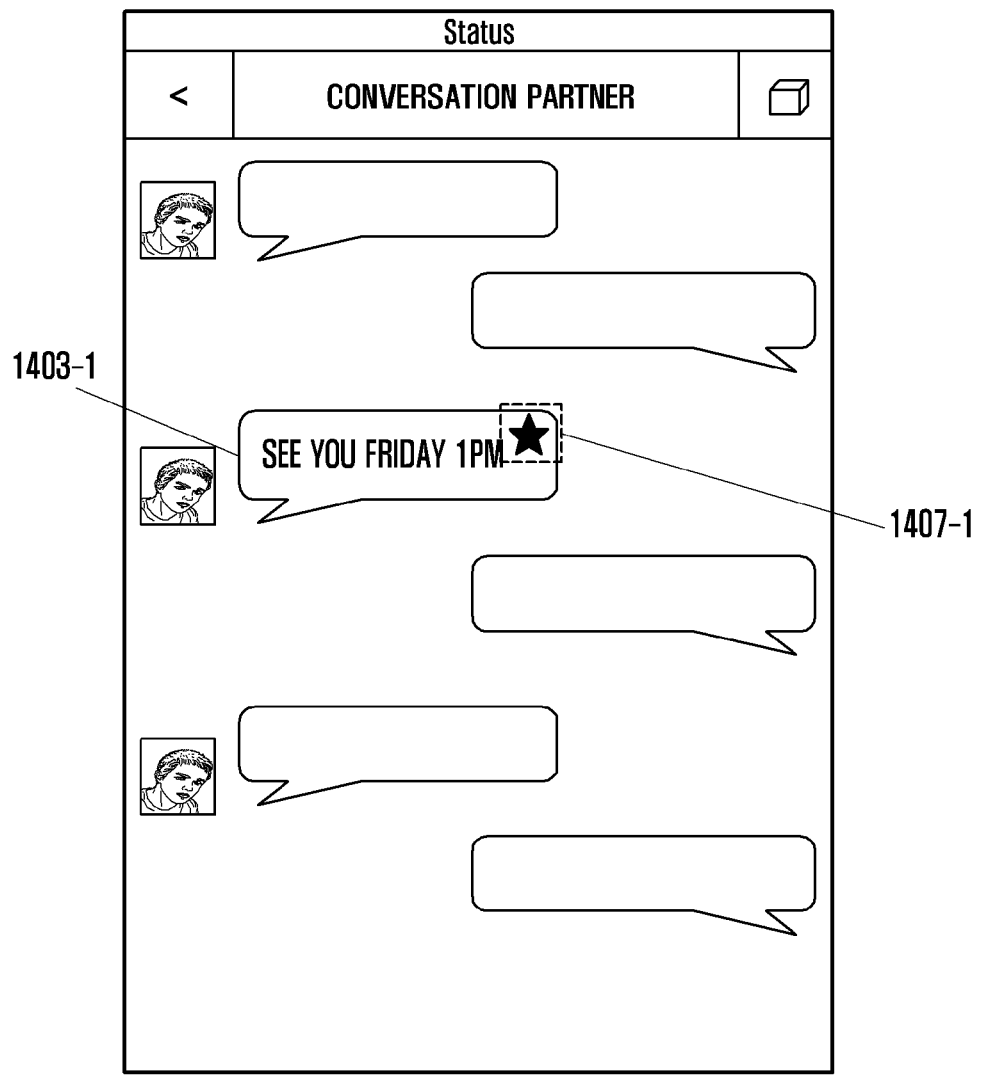

[Fig. 14d]
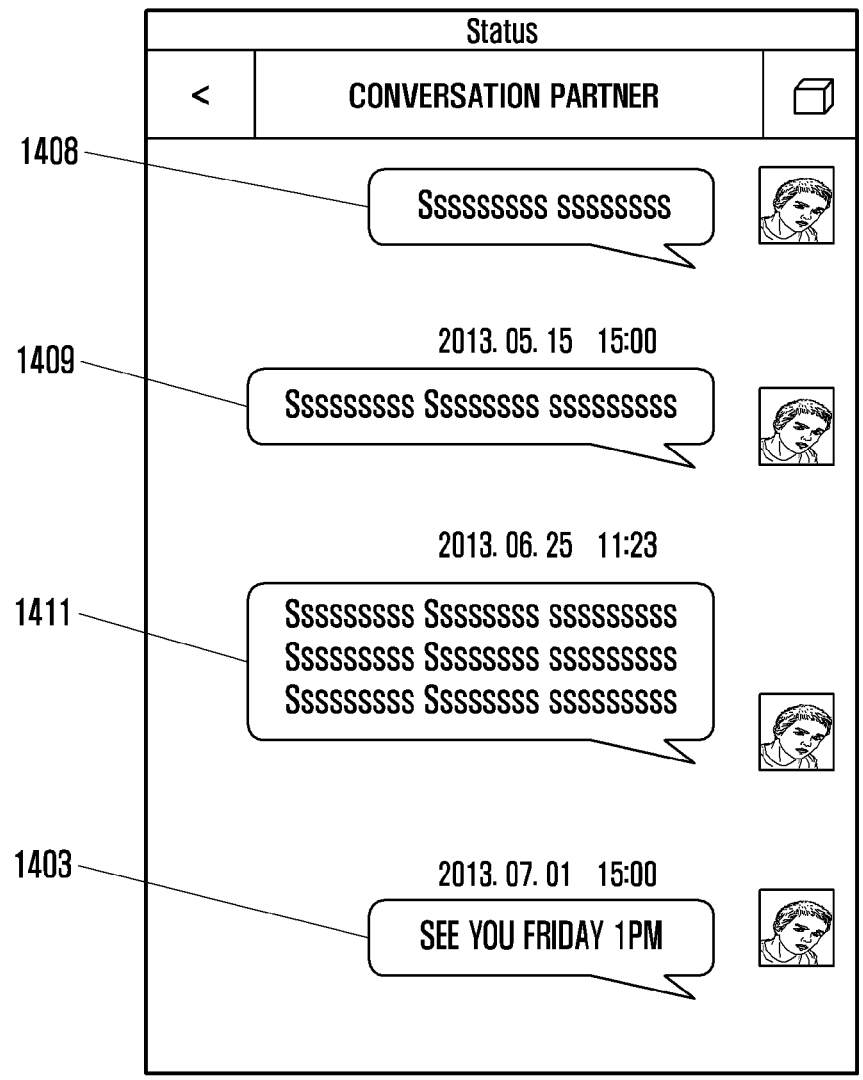

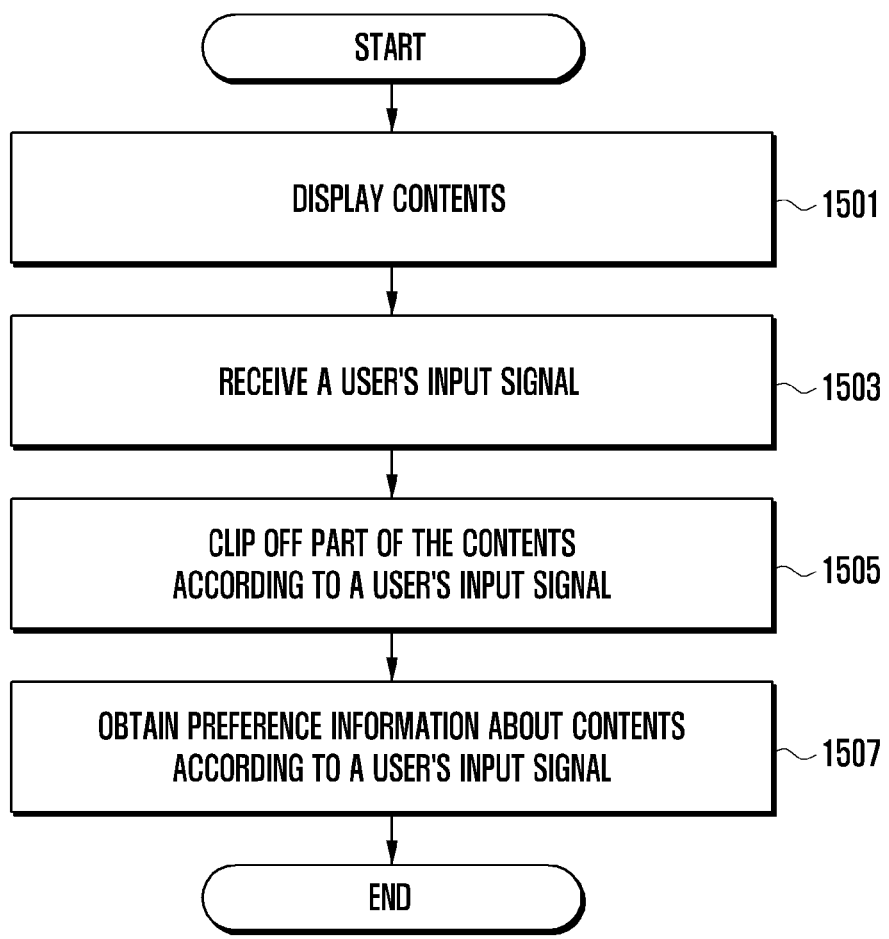
[Fig. 15]

[Fig. 16a]
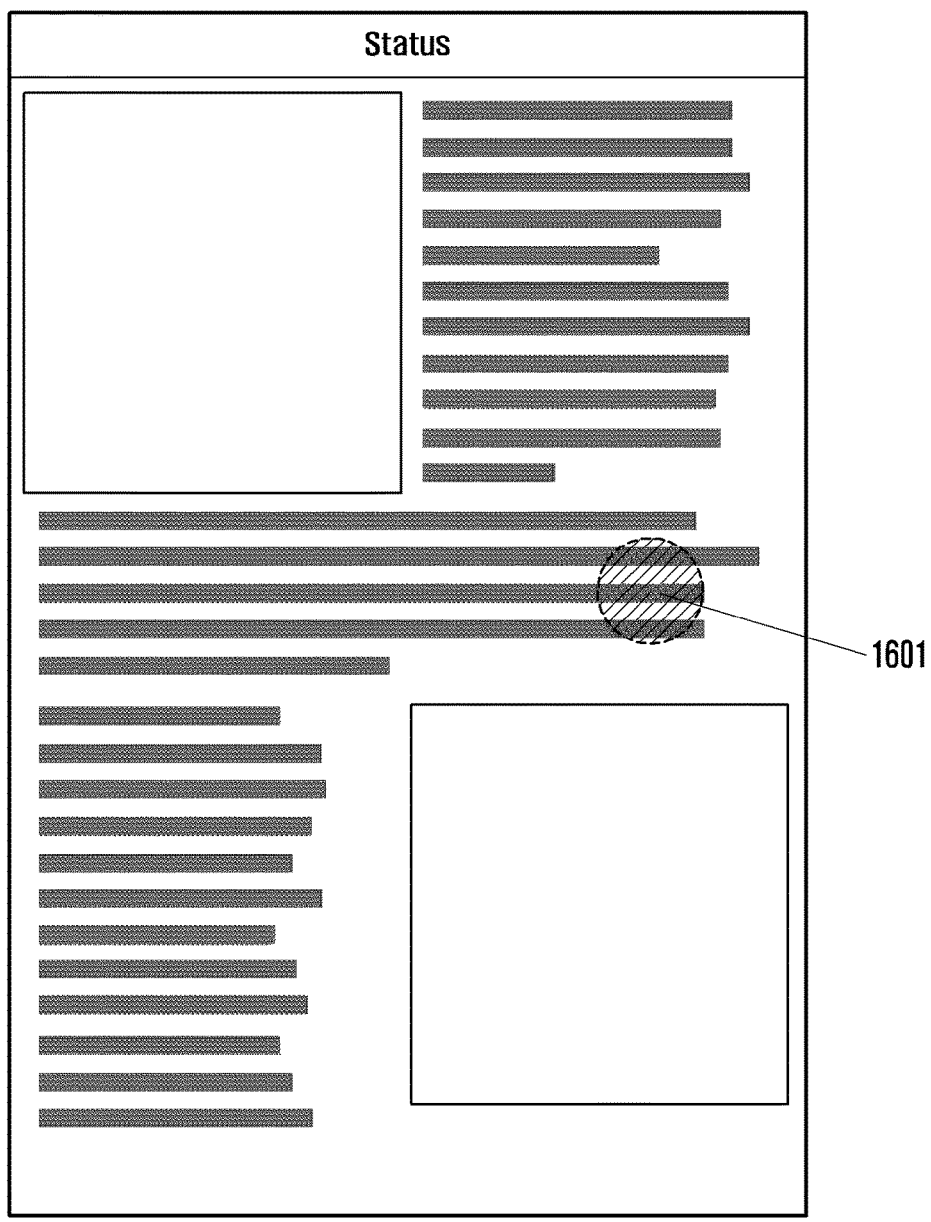

[Fig. 16b]
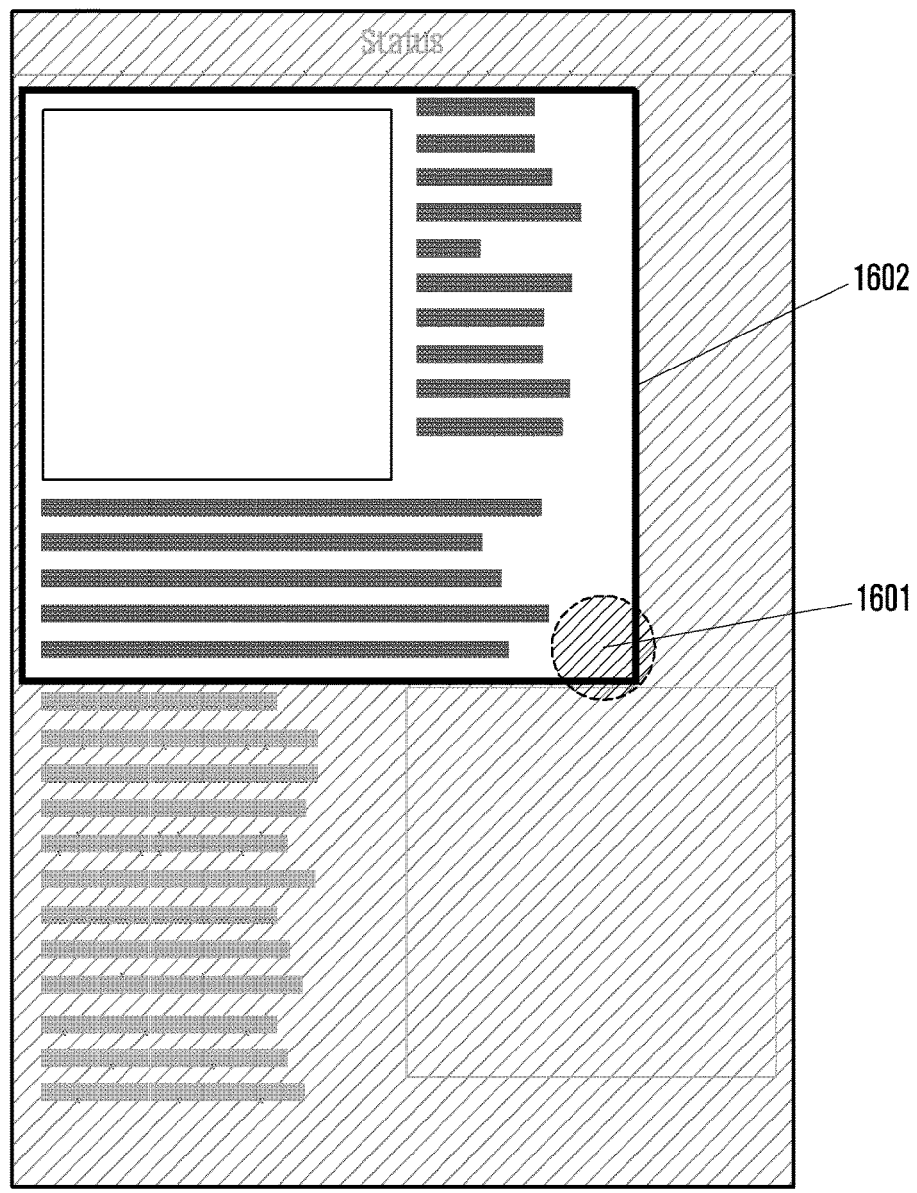

[Fig. 16c]
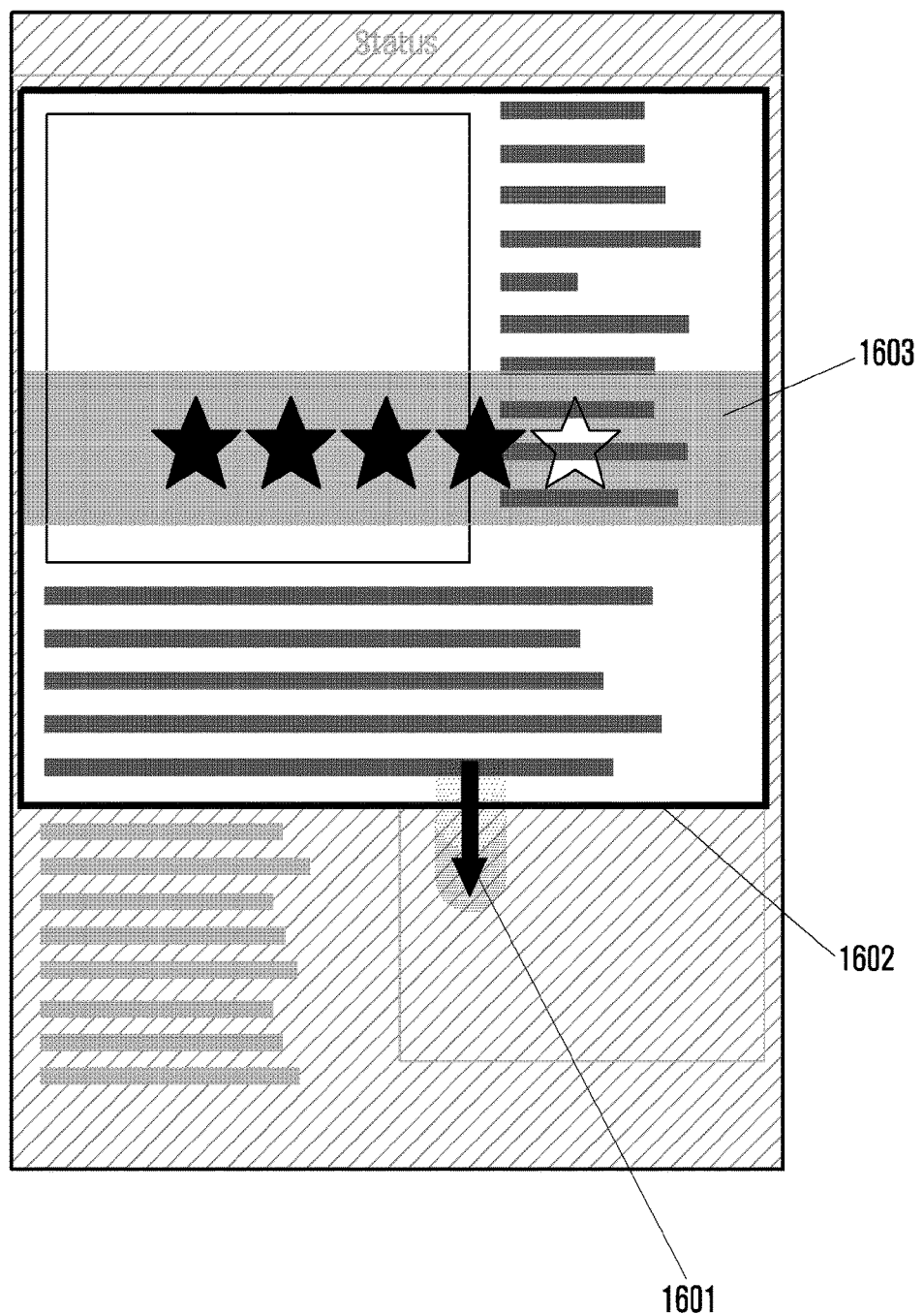

[Fig. 17]
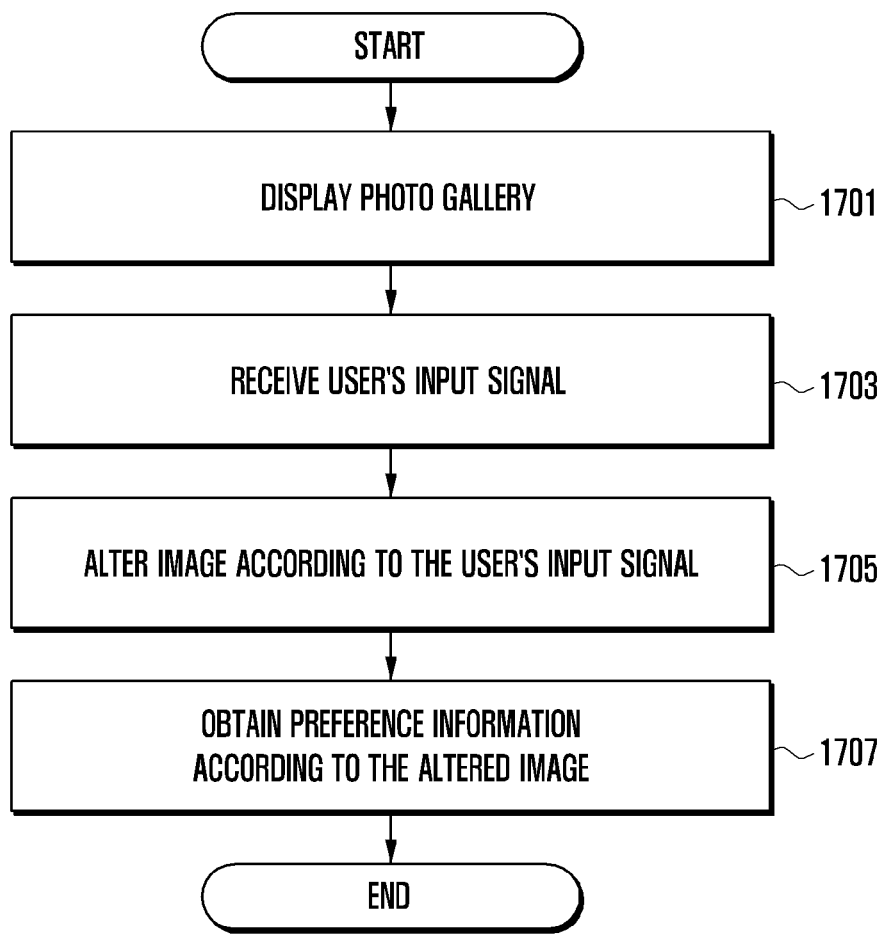

[Fig. 18a]
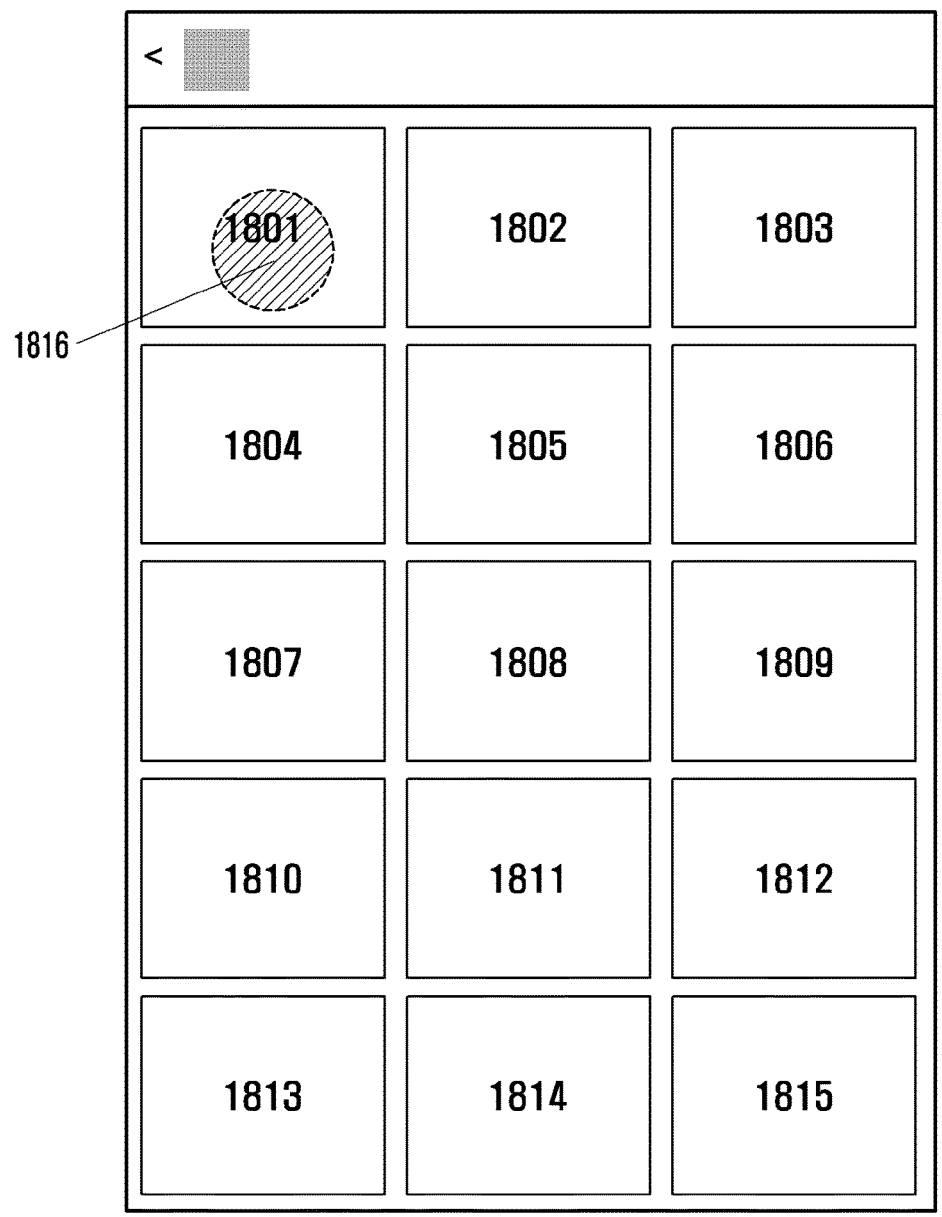

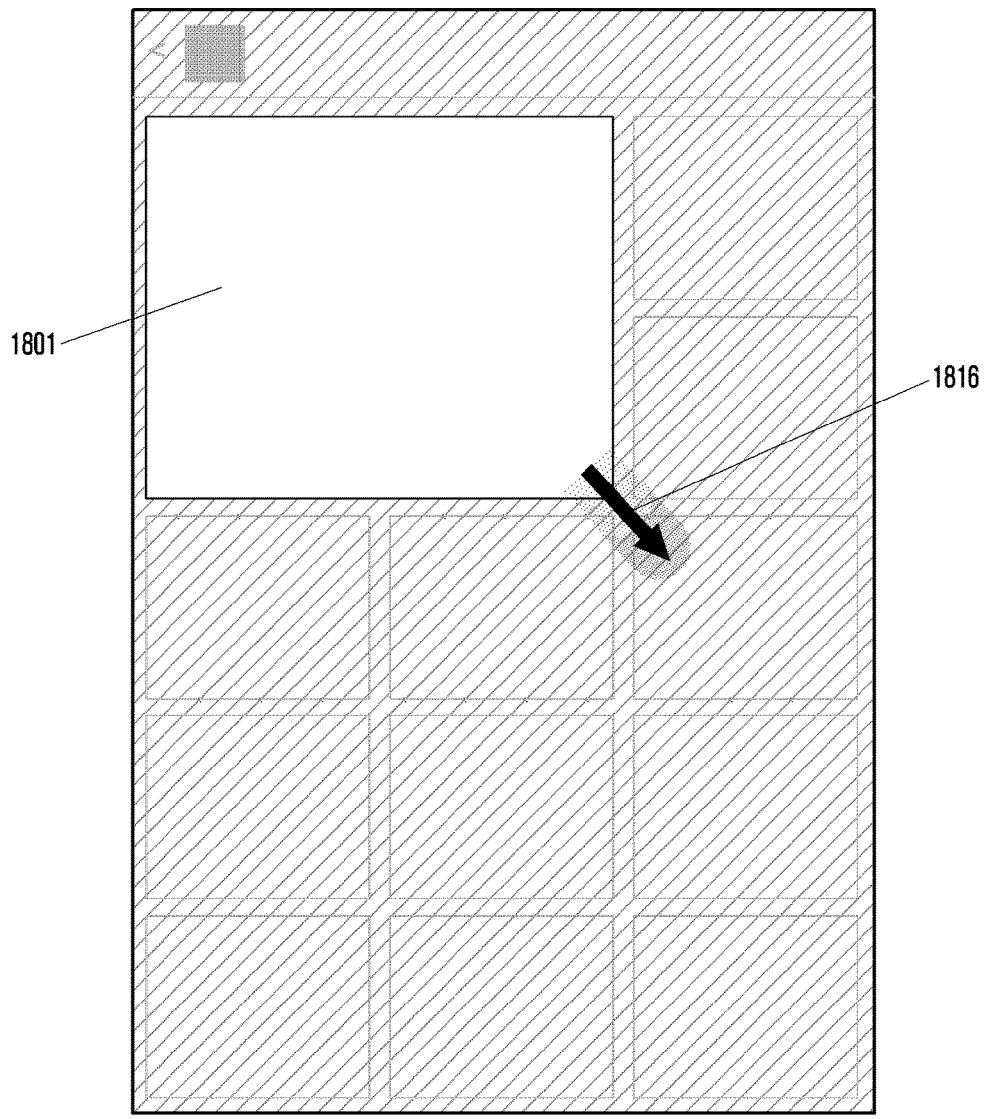
[Fig. 18b]

[Fig. 18c]
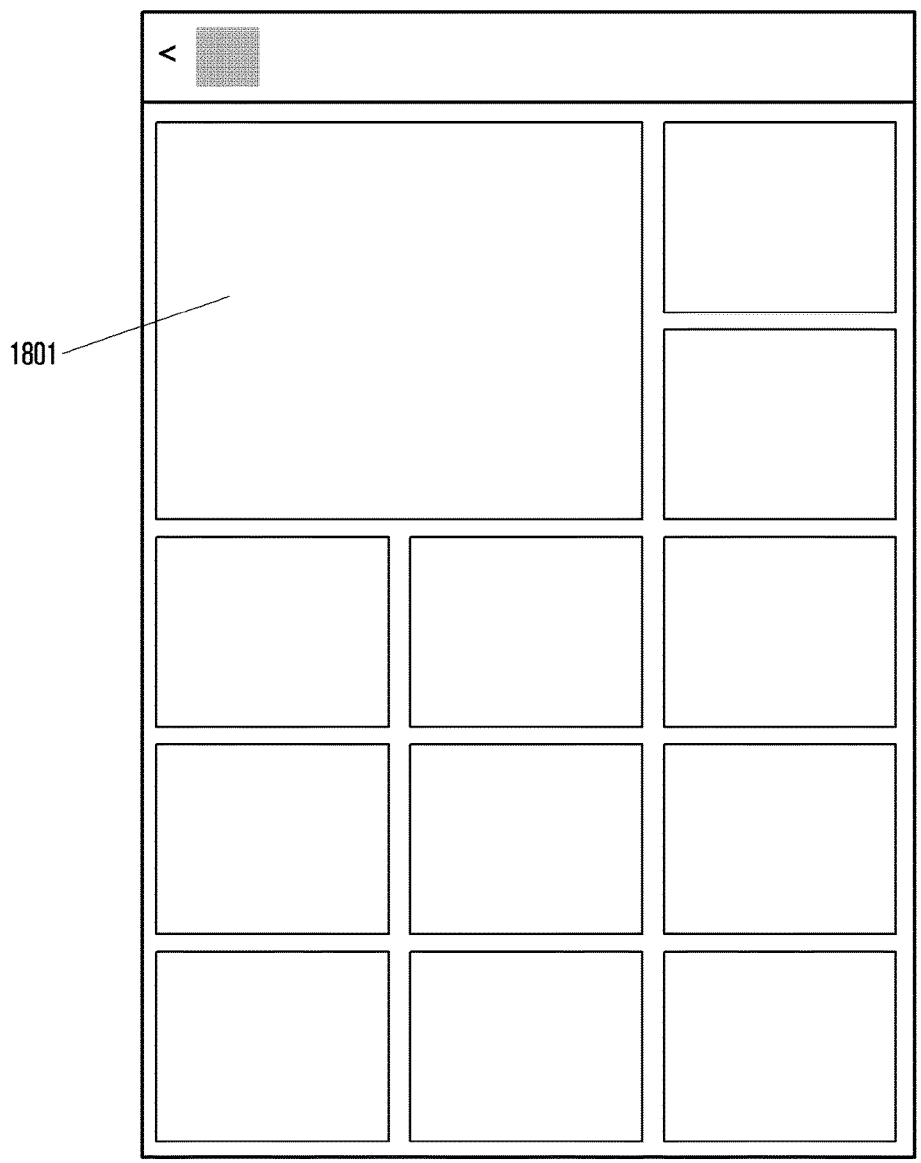

[Fig. 19]
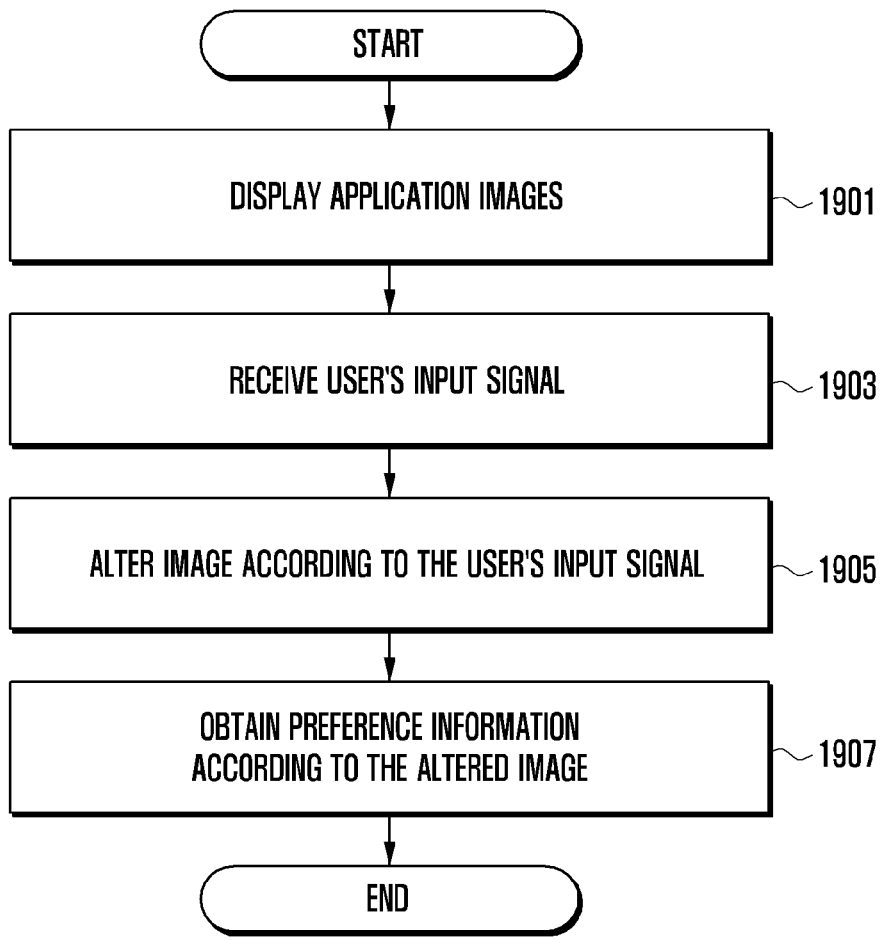

[Fig. 20a]
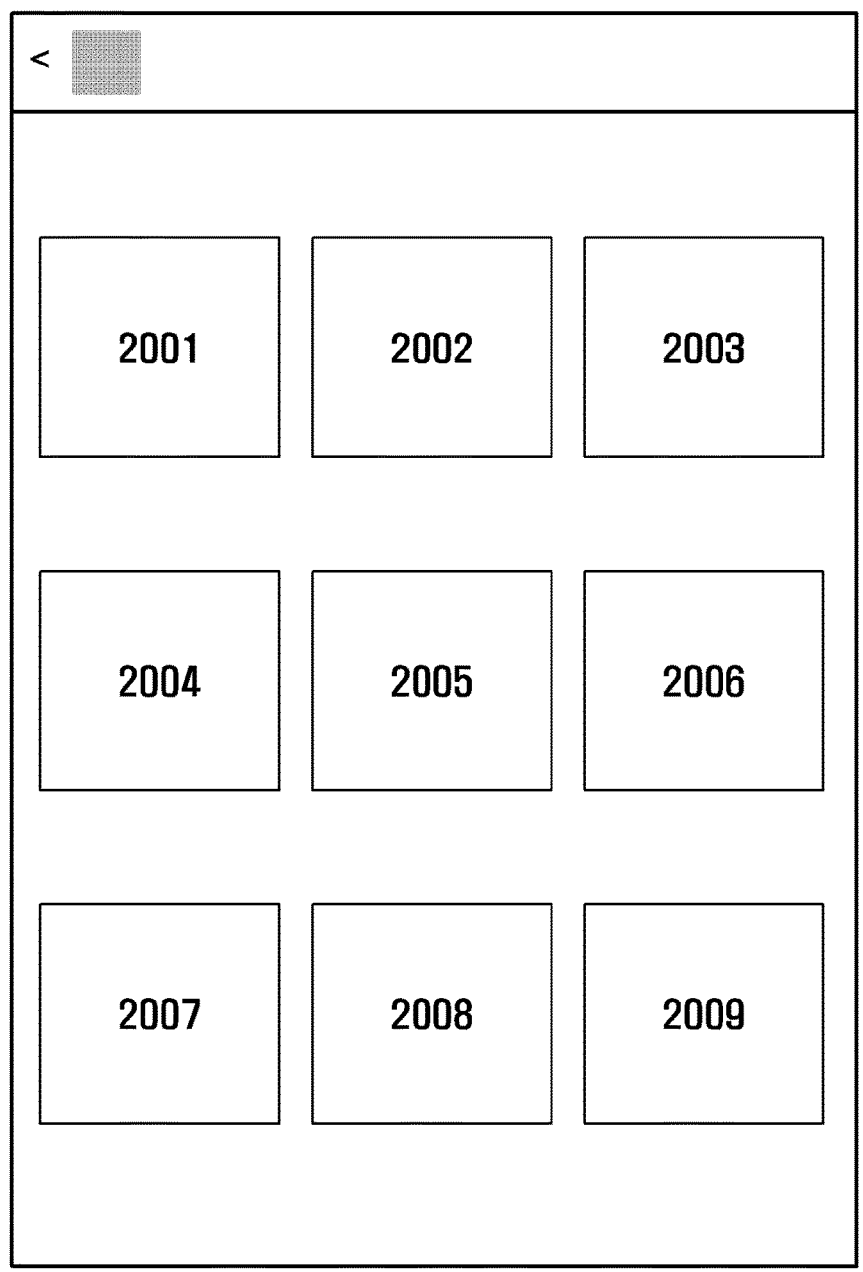

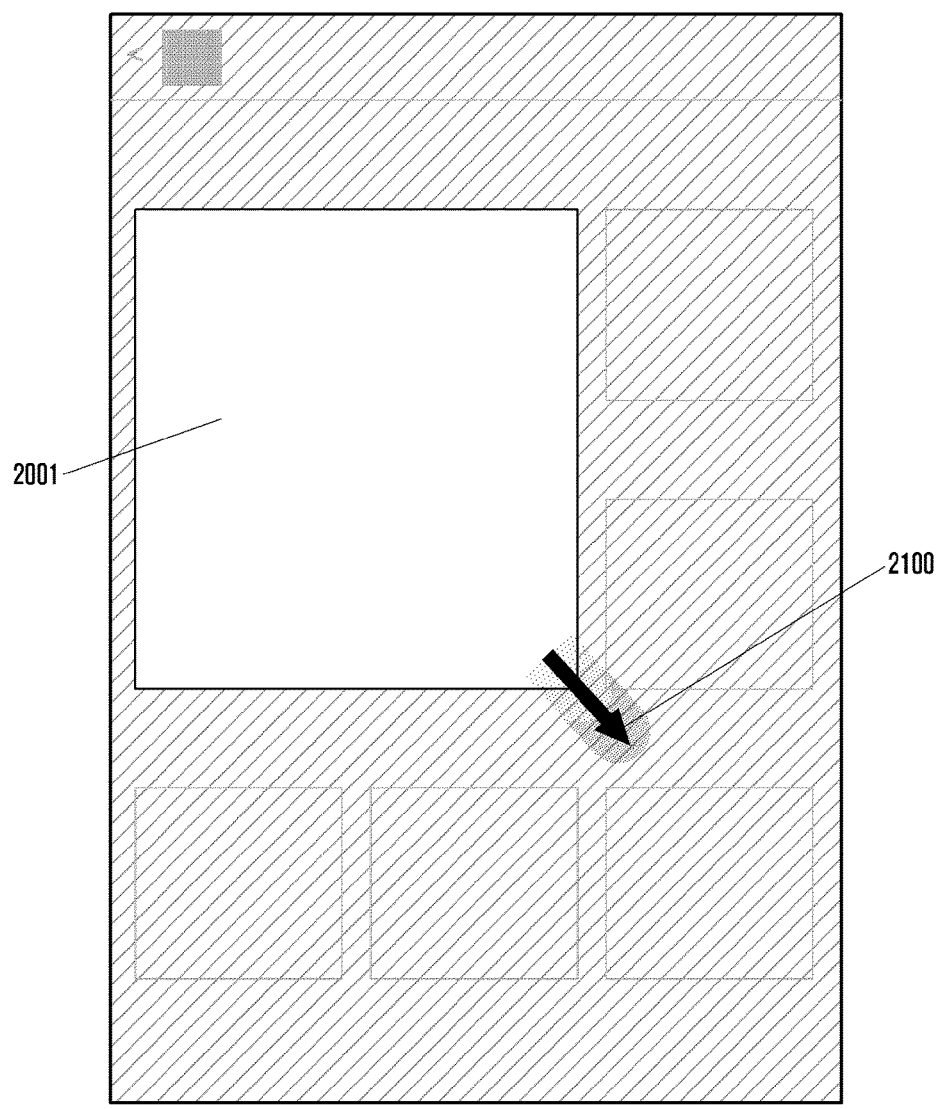
[Fig. 20b]

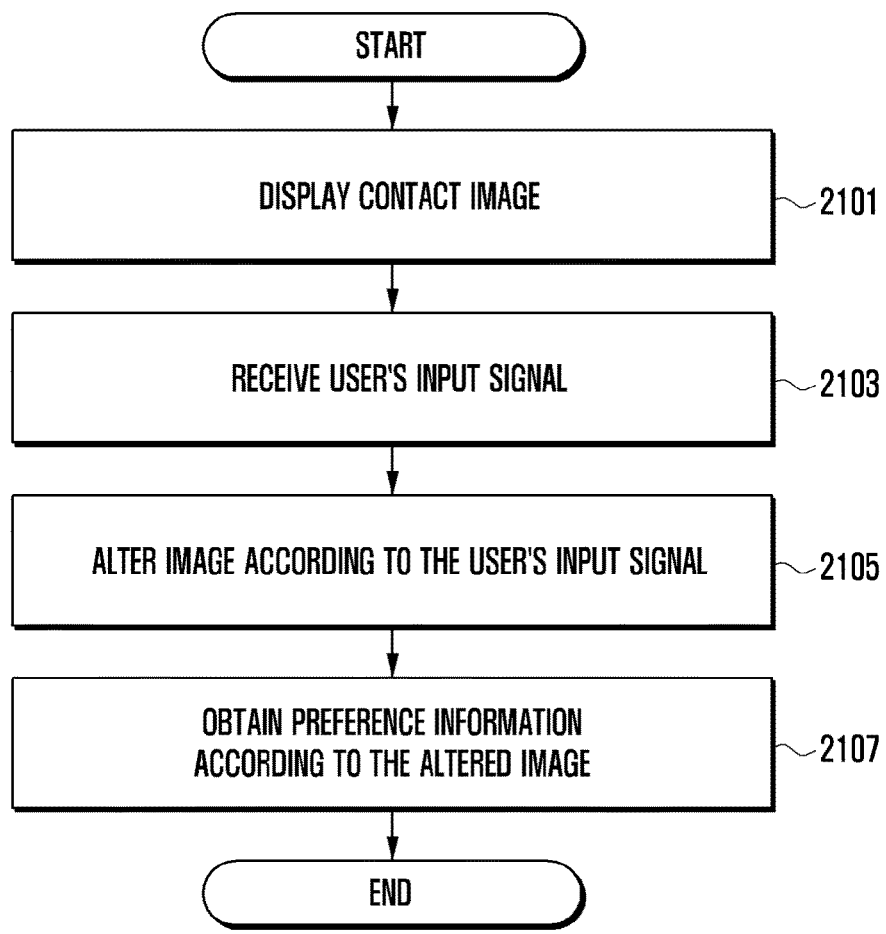
[Fig. 21]

[Fig. 22a]
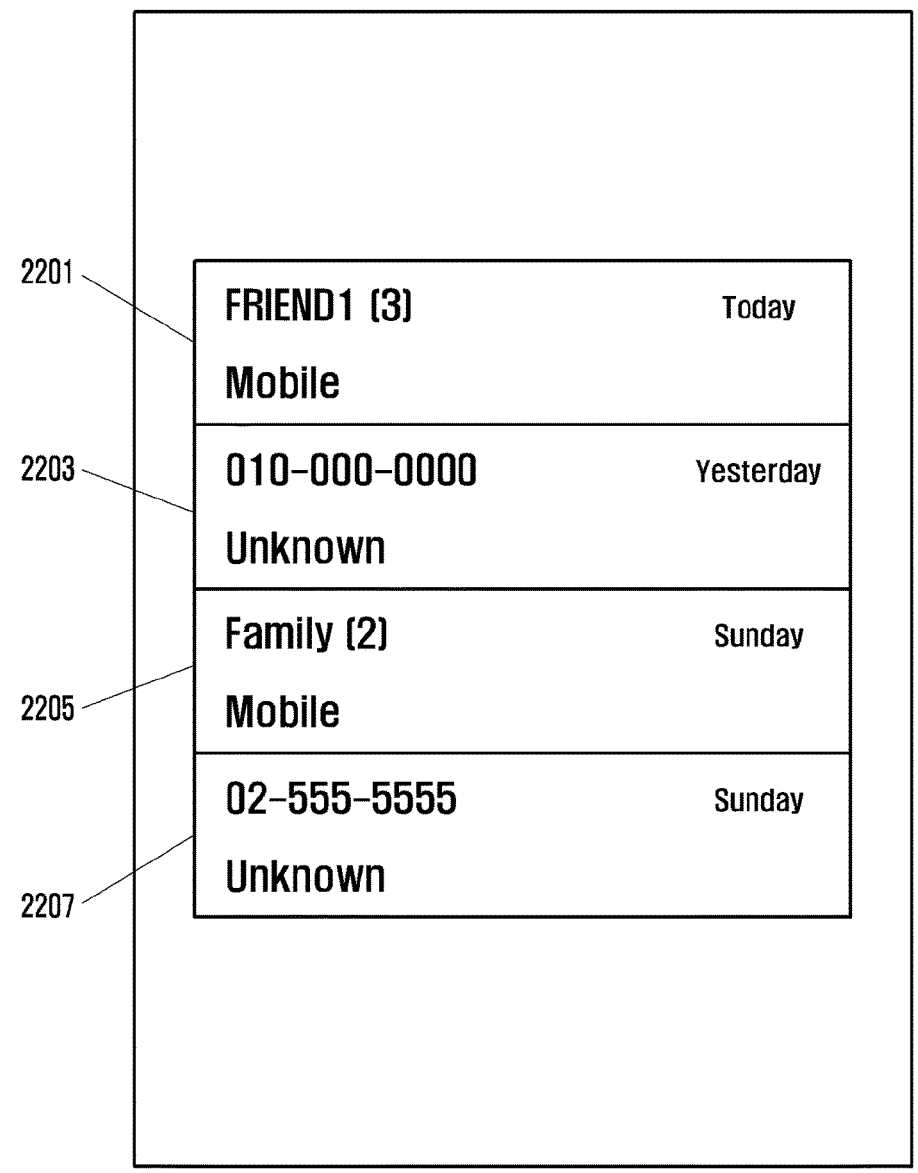

[Fig. 22b]
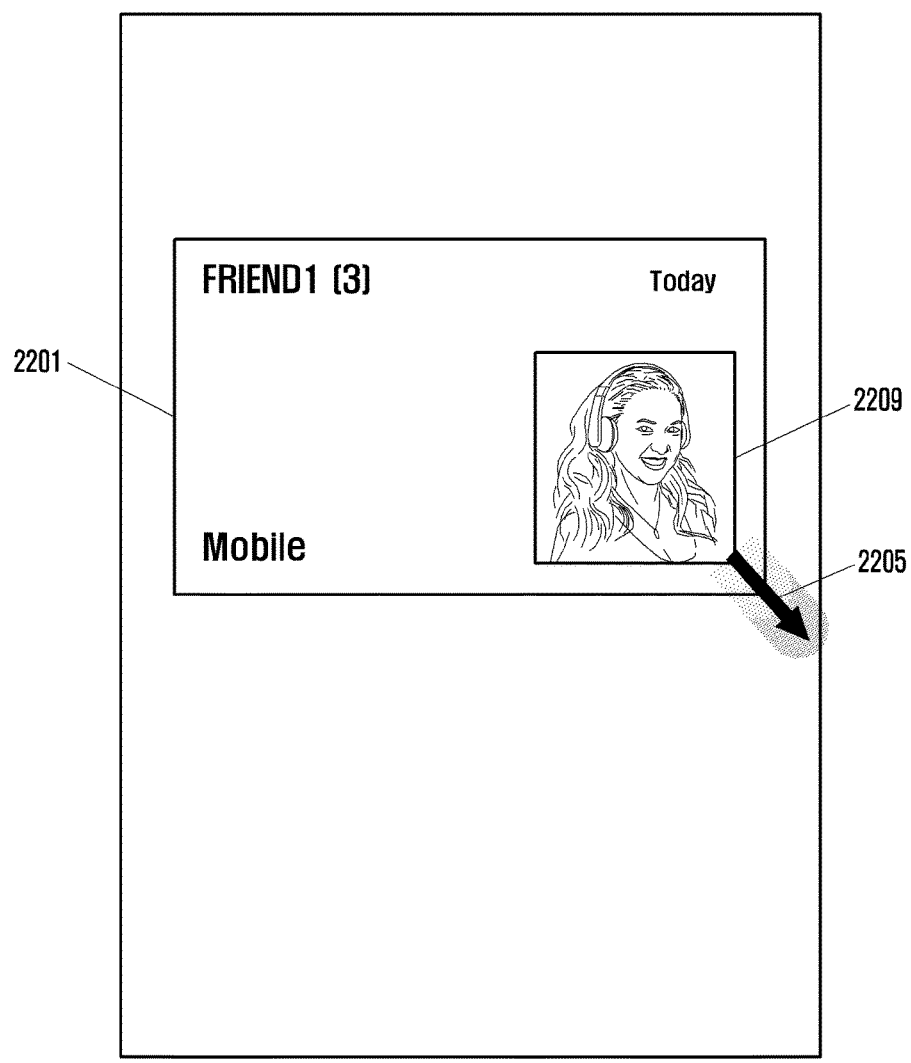

[Fig. 23]
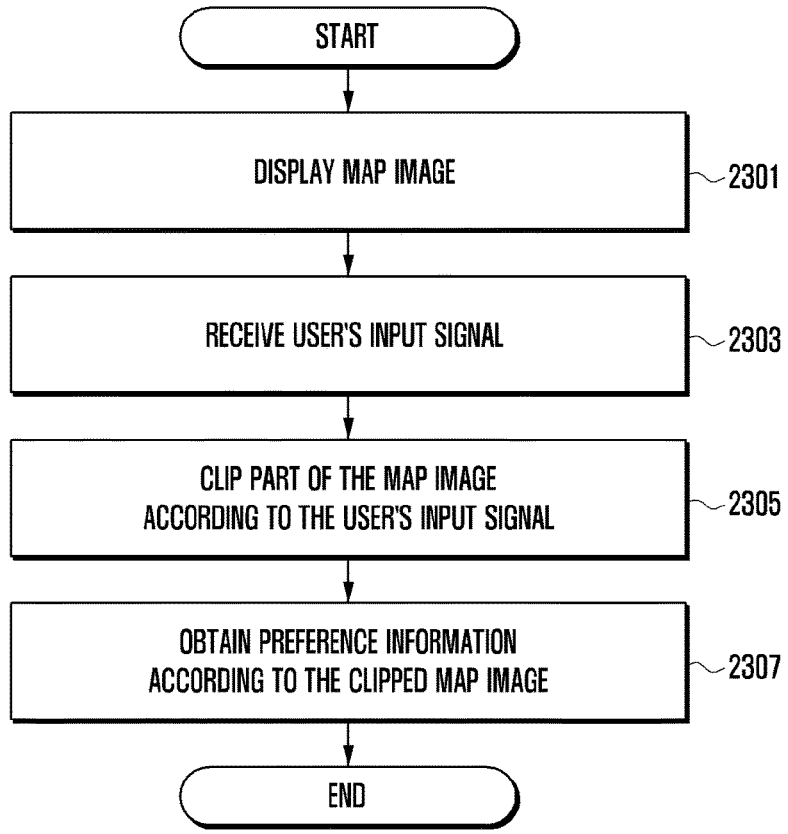
[Fig. 24a]
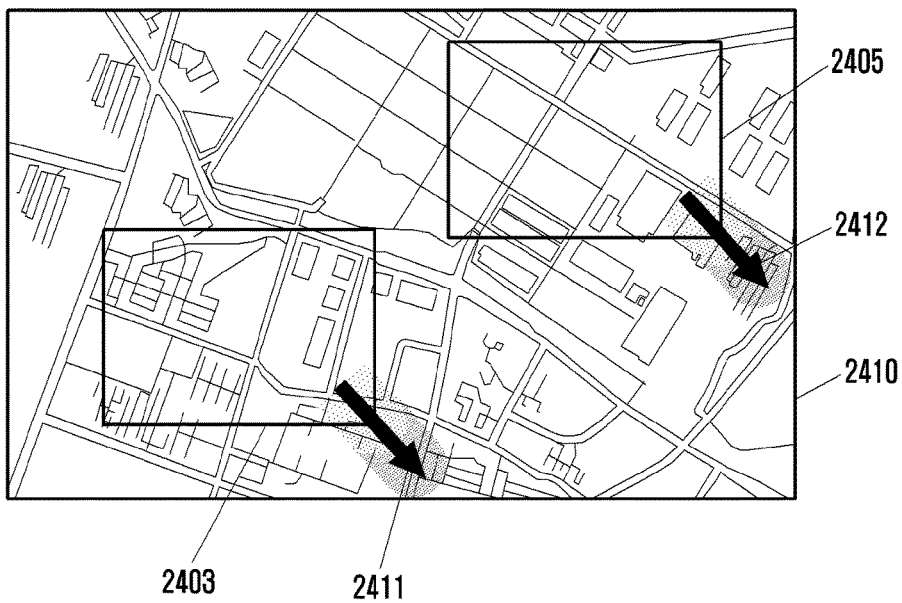

[Fig. 24b]
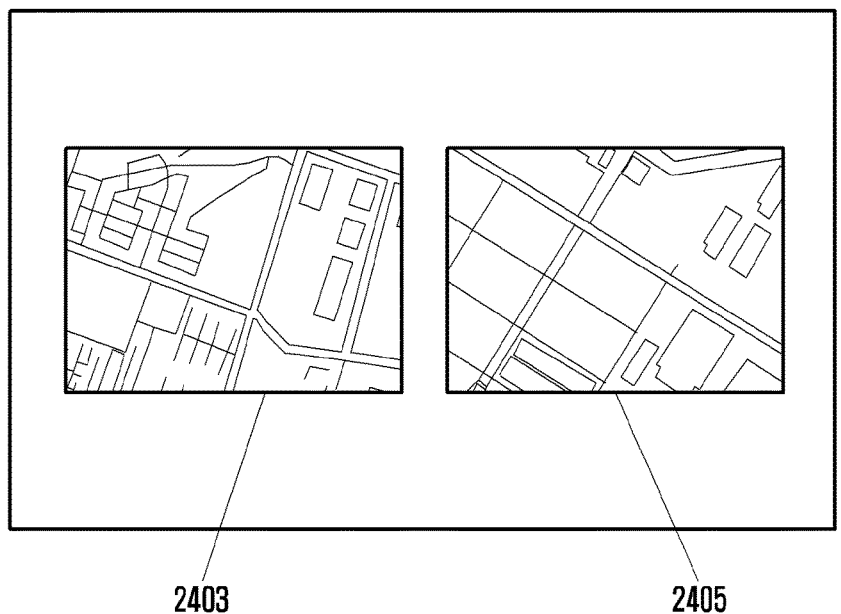
2403　　　　　2405

ELECTRONIC DEVICE AND USER INTERFACE DISPLAY METHOD FOR THE SAME

PRIORITY

This application is a National Phase Entry of PCT International Application No. PCT/KR2015/000664, which was filed on Jan. 22, 2015, and claims priority to Korean Patent Application No. 10-2014-0008075, which was filed on Jan. 23, 2014, the contents of each of which are incorporated herein by reference.

TECHNICAL FIELD

The present invention relates to electronic devices, and more particularly, to a method of displaying electronic documents and/or items on a list on an electronic device.

BACKGROUND ART

As the number of functions/applications performed by an electronic device increases, it has recently been important to design a user interface that allows users to easily interact with the electronic device. The user interface is a gateway through which users receive not only contents but also responses to user actions or behaviors.

For example, electronic devices provided electronic documents and/or items on a list or in a thumbnail view as a user interface so that users can easily search for them.

Although conventional electronic devices provided electronic documents and/or items on a list or in a thumbnail view as a user interface, they have not applied user preference to the providing system and this makes it difficult for users to search for one or more electronic files or items.

DISCLOSURE OF INVENTION

Solution to Problem

The present invention has been made in view of the above problems, and provides a method of displaying electronic documents and/or items on a list or in a thumbnail view based on user preference. The present invention further provides an electronic device adapted to the method.

In accordance with an exemplary embodiment of the present invention, the present invention provides a method of displaying a user interface on an electronic device including: displaying one or more images; obtaining preference information; and altering the images according to the preference information and displaying the altered images.

In accordance with another exemplary embodiment of the present invention, the present invention provides an electronic device including: a display unit; a user input unit; and a processor. The processor displays one or more images on the display unit, obtains preference information through the user input unit, alters the images according to the preference information and displays the altered images on the display unit.

BRIEF DESCRIPTION OF DRAWINGS

The features and advantages of the invention will become more apparent from the following detailed description in conjunction with the accompanying drawings, in which:

FIG. 1 illustrates a network environment including an electronic device according to various embodiments of the present disclosure;

FIG. 2 is a block diagram of an electronic device according to various embodiments of the present disclosure;

FIG. 3 is a block diagram of a programming module according to various embodiments of the present disclosure;

FIG. 4 is a signal flow chart that describes a method for displaying a user interface, between an electronic device and a server, according to embodiments of the present invention;

FIG. 5 is a signal flow chart that describes a method for displaying a user interface, between an electronic device and a server, according to embodiments of the present invention;

FIG. 6 is a diagram that describes a method for displaying a user interface of an electronic device according to embodiments of the present invention;

FIG. 7 is a flow chart that describes a method for displaying a user interface of an electronic device according to embodiments of the present invention;

FIGS. 8A to 8C are diagrams that describe a method for displaying a user interface of an electronic device according to embodiments of the present invention;

FIG. 9 is a flow chart that describes a method for displaying a user interface of an electronic device according to embodiments of the present invention;

FIGS. 10A to 10C are diagrams that describe a method for displaying a user interface of an electronic device according to embodiments of the present invention;

FIG. 11 is a flow chart that describes a method for displaying a user interface of an electronic device according to embodiments of the present invention;

FIGS. 12A and 12B are diagrams that describe a method for displaying a user interface of an electronic device according to embodiments of the present invention;

FIG. 13 is a flow chart that describes a method for displaying a user interface of an electronic device according to embodiments of the present invention;

FIGS. 14A to 14D are diagrams that describe a method for displaying a user interface of an electronic device according to embodiments of the present invention;

FIG. 15 is a flow chart that describes a method for displaying a user interface of an electronic device according to embodiments of the present invention;

FIGS. 16A to 16C are diagrams that describe a method for displaying a user interface of an electronic device according to embodiments of the present invention;

FIG. 17 is a flow chart that describes a method for displaying a user interface of an electronic device according to embodiments of the present invention;

FIGS. 18A to 18C are diagrams that describe a method for displaying a user interface of an electronic device according to embodiments of the present invention;

FIG. 19 is a flow chart that describes a method for displaying a user interface of an electronic device according to embodiments of the present invention;

FIGS. 20A and 20B are diagrams that describe a method for displaying a user interface of an electronic device according to embodiments of the present invention;

FIG. 21 is a flow chart that describes a method for displaying a user interface of an electronic device according to embodiments of the present invention;

FIGS. 22A and 22B are diagrams that describe a method for displaying a user interface of an electronic device according to embodiments of the present invention;

FIG. 23 is a flow chart that describes a method for displaying a user interface of an electronic device according to embodiments of the present invention; and FIGS. 24A and 24B are diagrams that describe a method for displaying a user interface of an electronic device according to embodiments of the present invention.

MODE FOR THE INVENTION

Hereinafter, the present disclosure will be described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch.

According to some embodiments, the electronic device may be a smart home appliance having a communication function. The smart home appliance may include at least one of a TeleVision (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

FIG. 1 illustrates a network environment including an electronic device 100 according to various embodiments of the present disclosure.

Referring to FIG. 1, the electronic apparatus 100 may include a bus 110, a processor 120, a memory 130, a user input module 140, a display module 150, and a communication module 160. The bus 110 may be a circuit connecting the above described components and transmitting communication (for example, a control message) between the above described components.

The processor 120 may receive commands from the above-described other elements (e.g., the memory 130, the user input module 140, the display module 150, the communication module 160, etc.) through the bus 110, may interpret the received commands, and may execute calculation or data processing according to the interpreted commands.

The memory 130 may store commands or data received from the processor 120 or other elements (e.g., the user input module 140, the display 150, the communication module 160, etc.) or generated by the processor 120 or the other elements. The memory 130 may include programming modules, such as a kernel 131, middleware 132, an Application Programming Interface (API) 133, an application 134, and the like. Each of the above-described programming modules may be implemented in software, firmware, hardware, or a combination of two or more thereof.

The kernel 131 may control or manage system resources (e.g., the bus 110, the processor 120, the memory 130, etc.) used to execute operations or functions implemented by other programming modules (e.g., the middleware 132, the API 133, and the application 134). Also, the kernel 131 may provide an interface capable of accessing and controlling or managing the individual elements of the electronic device 100 by using the middleware 132, the API 133, or the application 134.

The middleware 132 may serve to go between the API 133 or the application 134 and the kernel 131 in such a manner that the API 133 or the application 134 communicates with the kernel 131 and exchanges data therewith. Also, in relation to work requests received from one or more applications 134 and/or the middleware 132, for example, may perform load balancing of the work requests by using a method of assigning a priority, in which system resources (e.g., the bus 110, the processor 120, the memory 130, etc.) of the electronic device 100 can be used, to at least one of the one or more applications 134.

The API 133 is an interface through which the application 134 is capable of controlling a function provided by the kernel 131 or the middleware 132, and may include, for example, at least one interface or function for file control, window control, image processing, character control, or the like.

According to various embodiments, the application 134 may include a Short Message Service (SMS)/Multimedia Messaging Service (MMS) application, an email application, a calendar application, an alarm application, a health care application (for example, application measuring quantity of exercise or blood sugar) or an environment information application (for example, application providing information on barometric pressure, humidity or temperature). Additionally or alternatively, the application 134 may be an application related to an information exchange between the electronic device 100 and an external electronic device (for example, electronic device 201, electronic device 202 or sever 203). The application related to the information exchange may include, for example, a notification relay application for transferring particular information to the external electronic device or a device management application for managing the external electronic device.

For example, the notification relay application may include a function of transmitting notification information generated by another application (for example, an SMS/MMS application, an email application, a health care application or an environment information application) of the electronic device 100 to the external electronic device (for example, electronic device 201, electronic device 202 or sever 203). Additionally or alternatively, the notification relay application may receive notification information from, for example, the external electronic device and provide the received notification information to the user. The device management application may manage (for example, install, remove, or update) at least a part of functions (for example, turning on/off the external electronic device (or some components of the external electronic device) or controlling a brightness of the display) of the external electronic device communicating with the electronic device 100, an application executed in the external electronic device, or a service (for example, call service or message service) provided by the external electronic device.

According to various embodiments, the application 134 may include an application designated according to an attribute (for example, type of electronic device) of the external electronic device (for example, electronic device 201, electronic device 202 or sever 203). For example, when the external electronic device is an MP3 player, the application 134 may include an application related to music reproduction. Similarly, when the external electronic device is a mobile medical device, the application 134 may include an application related to health care. According to an embodiment, the application 134 may include at least one of an application designated to the electronic device 100 and an application received from an external electronic device (for example, electronic device 201, electronic device 202 or sever 203).

The input/output interface 140 transmits a command or data input from the user through an input/output device (for example, a sensor, a keyboard, or a touch screen) to the processor 120, the memory 130, or the communication module 160 through, for example, the bus 110. For example, the user input module 140 may provide data on a user's touch input through a touch screen to the processor 120. Further, the user input module 140 may output a command or data received, through, for example, the bus 110, from the processor 120, the memory 130, or the communication module 160 through the input/output device (for example, a speaker or a display). For example, the input/output interface 140 may output voice data processed through the processor 120 to the user through the speaker.

The display 150 displays various pieces of information (for example, multimedia data, text data, or the like) for the user.

The communication module 160 connects communication between the electronic device 100 and the external device (for example, electronic device 201, electronic device 202 or sever 203). For example, the communication module 160 may access a network 200 through wireless or wired communication to communicate with the external device. The wireless communication includes at least one of, for example, WiFi, BlueTooth (BT), Near Field Communication (NFC), a Global Positioning System (GPS), and cellular communication (for example, LTE, LTE-A, CDMA, WCDMA, UMTS, WiBro or GSM). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the network 200 may be a telecommunication network. The telecommunication network includes at least one of a computer network, Internet, Internet of things, and a telephone network. According to an embodiment, a protocol (for example, transport layer protocol, data link layer protocol, or physical layer protocol) for communication between the electronic device 100 and the external device may be supported by at least one of the application 134, the application programming interface 133, the middleware 132, the kernel 131, and the communication interface 160.

FIG. 2 is a block diagram of an electronic device 100 according to various embodiments of the present disclosure. Referring to FIG. 2, the electronic device 100 may include one or more processors 120, a memory 130, the user input module 140, a display 150 a communication module 160, a sensor module 190, an audio module 170, and a camera module 180. The processor 120 may include one or more Application Processors (APs) 121, or one or more Communication Processors (CPs) 122. The AP 121 and the CP 122 are illustrated as being included in the processor 120 in FIG. 2, but may be included in different Integrated Circuit (IC) packages, respectively. According to an embodiment of the present disclosure, the AP 121 and the CP 122 may be included in one IC package.

The AP 121 may execute an Operating System (OS) or an application program, and thereby may control multiple hardware or software elements connected to the AP 121 and may perform processing of and arithmetic operations on various data including multimedia data. The AP 121 may be implemented by, for example, a System on Chip (SoC). According to an embodiment of the present disclosure, the processor 120 may further include a Graphical Processing Unit (GPU) (not illustrated).

The CP 122 may manage a data line and may convert a communication protocol in the case of communication between the electronic device 100 and different electronic devices (for example, electronic device 201, electronic device 202 or sever 203) connected to the electronic device through the network. The CP 123 may be implemented by, for example, a SoC. According to an embodiment of the present disclosure, the CP 122 may perform at least some of multimedia control functions. The CP 122, for example, may distinguish and authenticate a terminal in a communication network by using a subscriber identification module (e.g., the SIM card 214). Also, the CP 122 may provide the user with services, such as a voice telephony call, a video telephony call, a text message, packet data, and the like.

Further, the CP 122 may control the transmission and reception of data by the communication module 230. In FIG. 2, the elements such as the CP 122, the memory 130, and the like are illustrated as elements separate from the AP 121. However, according to an embodiment of the present disclosure, the AP 121 may include at least some (e.g., the CP 122) of the above-described elements.

According to an embodiment of the present disclosure, the AP 121 or the CP 122 may load, to a volatile memory, a command or data received from at least one of a non-volatile memory and other elements connected to each of the AP 121 and the CP 122, and may process the loaded command or data. Also, the AP 121 or the CP 122 may store, in a non-volatile memory, data received from or generated by at least one of the other elements.

The memory 130 may include an internal memory 135 and an external memory 136. The memory 130 may be, for example, the memory 130 illustrated in FIG. 1. The internal memory 135 may include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to an embodiment of the present disclosure, the internal memory 135 may be in the form of a Solid State Drive (SSD). The external memory 136 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The user input module 140 may include a touch panel 141, a pen sensor 142 (e.g., a digital pen sensor), keys 143, and an ultrasonic input unit 144. The touch panel 141 may recognize a touch input in at least one of, for example, a capacitive scheme, a resistive scheme, an infrared scheme, and an acoustic wave scheme. Also, the touch panel 141 may further include a controller (not illustrated). In the capacitive type, the touch panel 141 is capable of recognizing proximity as well as a direct touch. The touch panel 141 may further include a tactile layer (not illustrated). In this event, the touch panel 141 may provide a tactile response to the user.

The pen sensor 142 (e.g., a digital pen sensor), for example, may be implemented by using a method identical or similar to a method of receiving a touch input from the user, or by using a separate sheet for recognition. For example, a key pad or a touch key may be used as the keys 143. The ultrasonic input unit 144 enables the terminal to sense a sound wave by using a microphone (e.g., a microphone 174) of the terminal through a pen generating an ultrasonic signal, and to identify data. The ultrasonic input unit 144 is capable of wireless recognition. According to an embodiment of the present disclosure, the electronic device 100 may receive a user input from an external device (e.g., a network, a computer, or a server), which is connected to the communication module 160, through the communication module 160.

The display module 150 may include a panel 151, a hologram 152, or a projector 153. The panel 151 may be, for example, a Liquid Crystal Display (LCD) and an Active Matrix Organic Light Emitting Diode (AM-OLED) display, and the like. The panel 151 may be implemented so as to be, for example, flexible, transparent, or wearable. The panel 151 may include the touch panel 141 and one module. The hologram 152 may display a three-dimensional image in the air by using interference of light. The projector 153 projects light on a screen to display an image. For example, the screen may be located inside or outside the electronic device 100. According to an embodiment of the present disclosure, the display module 150 may further include a control circuit for controlling the panel 151, a hologram 152, or a projector 153.

The communication module 160 may include a wireless communication module 162 or a Radio Frequency (RF) module 161. The wireless communication module 162 may include, for example, a Wi-Fi part 163, a BT part 164, a GPS part 165, or a NFC part 166. For example, the wireless communication module 162 may provide a wireless communication function by using a radio frequency. Additionally or alternatively, the wireless communication module 162 may include a network interface (e.g., a LAN card), a modulator/demodulator (modem), or the like for connecting the electronic device 100 to a network (e.g., the Internet, a LAN, a WAN, a telecommunication network, a cellular network, a satellite network, a POTS, or the like).

The RF module 161 may be used for transmission and reception of data, for example, transmission and reception of RF signals or called electronic signals. Although not illustrated, the RF unit 161 may include, for example, a transceiver, a Power Amplifier Module (PAM), a frequency filter, a Low Noise Amplifier (LNA), or the like. Also, the RF module 161 may further include a component for transmitting and receiving electromagnetic waves in a free space in a wireless communication, for example, a conductor, a conductive wire, or the like.

The audio module 170 may bi-directionally convert between a voice and an electrical signal. The audio module 170 may convert voice information, which is input to or output from the audio codec 280, through, for example, a speaker 171, a receiver 172, an earphone 173, the microphone 174 or the like.

The camera module 180 may capture an image and a moving image. According to an embodiment, the camera module 180 may include one or more image sensors (e.g., a front lens or a back lens), an Image Signal Processor (ISP) (not illustrated), and a flash LED (not illustrated).

The sensor module 190 may include, for example, at least one of a gesture sensor 190A, a gyro sensor 190B, an atmospheric pressure sensor 190C, a magnetic sensor 190D, an acceleration sensor 190E, a grip sensor 190F, a proximity sensor 190G, a Red, Green and Blue (RGB) sensor 190H, a biometric sensor 190I, a temperature/humidity sensor 190J, an illuminance sensor 190K, and a Ultra Violet (UV) sensor 190M. The sensor module 190 may measure a physical quantity or may sense an operating state of the electronic device 100, and may convert the measured or sensed information to an electrical signal. Additionally/alternatively, the sensor module 190 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. Additionally or alternatively, the sensor module 190 may include, for example, an E-nose sensor (not illustrated), an EMG sensor (not illustrated), an EEG sensor (not illustrated), an ECG sensor (not illustrated), a fingerprint sensor, and the like. The sensor module 190 may further include a control circuit (not illustrated) for controlling one or more sensors included therein.

Although not illustrated, the electronic device 100 may include a processing unit (e.g., a GPU) for supporting a module TV. The processing unit for supporting a module TV may process media data according to standards such as, for example, Digital Multimedia Broadcasting (DMB), Digital Video Broadcasting (DVB), media flow, and the like. FIG. 3 is a block diagram illustrating a configuration of a programming module 300 according to an embodiment of the present disclosure.

The programming module 300 may be included (or stored) in the electronic device 100 (e.g., the memory 130) illustrated in FIG. 1 and FIG. 2. At least a part of the programming module 300 may be implemented in software, firmware, hardware, or a combination of two or more thereof. Referring to FIG. 3, the programming module 300 may include a kernel 131, a middleware 132, an API 133, and/or the application 134.

The programming module 300 may be implemented in hardware (e.g., the electronic device 100), and may include an OS controlling resources related to an electronic device (e.g., the electronic device 100) and/or various applications (e.g., an application 134) executed in the OS. For example, the OS may be Android, iOS, Windows, Symbian, Tizen, Bada, and the like.

The kernel 131 (e.g., the kernel 131) may include a system resource manager 1311 and/or a device driver 1312. The system resource manager 1311 may include, for example, a process manager (not illustrated), a memory manager (not illustrated), and a file system manager (not illustrated). The system resource manager 1311 may perform the control, allocation, recovery, and/or the like of system resources. The device driver 1312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 132 may include multiple modules previously implemented so as to provide a function used in common by the applications 134. Also, the middleware 132 may provide a function to the applications 134 through the API 133 in order to enable the applications 134 to efficiently use limited system resources within the electronic device. For example, as illustrated in FIG. 3, the middleware 132 may include at least one of a runtime library 1353, an application manager 1321, a window manager 1322, a multimedia manager 1323, a resource manager 1324, a power manager 1325, a database manager 1326, a package manager 1327, a connectivity manager 1328, a notification manager 1329, a location manager 1350, a graphic manager 1351, a security manager 1352, and any other suitable and/or similar manager.

The runtime library 1353 may include, for example, a library module used by a complier, in order to add a new function by using a programming language during the execution of the application 134. According to an embodiment of the present disclosure, the runtime library 1353 may perform functions which are related to input and output, the management of a memory, an arithmetic function, and/or the like.

The application manager 1321 may manage, for example, a life cycle of at least one of the applications 134. The window manager 1322 may manage GUI resources used on the screen. The multimedia manager 1323 may detect a format used to reproduce various media files and may encode or decode a media file through a codec appropriate for the relevant format. The resource manager 1324 may manage resources, such as a source code, a memory, a storage space, and/or the like of at least one of the applications 134.

The power manager 1325 may operate together with a Basic Input/Output System (BIOS), may manage a battery or power, and may provide power information and the like used for an operation. The database manager 1326 may manage a database in such a manner as to enable the generation, search and/or change of the database to be used by at least one of the applications 134. The package manager 1327 may manage the installation and/or update of an application distributed in the form of a package file.

The connectivity manager 1328 may manage a wireless connectivity such as, for example, Wi-Fi and Bluetooth. The notification manager 1329 may display or report, to the user, an event such as an arrival message, an appointment, a proximity alarm, and the like in such a manner as not to disturb the user. The location manager 1350 may manage location information of the electronic device. The graphic manager 1351 may manage a graphic effect, which is to be provided to the user, and/or a user interface related to the graphic effect. The security manager 1352 may provide various security functions used for system security, user authentication, and the like. According to an embodiment of the present disclosure, when the electronic device (e.g., the electronic device 100) has a telephone function, the middleware 132 may further include a telephony manager (not illustrated) for managing a voice telephony call function and/or a video telephony call function of the electronic device.

The middleware 132 may generate and use a new middleware module through various functional combinations of the above-described internal element modules. The middleware 132 may provide modules specialized according to types of OSs in order to provide differentiated functions. Also, the middleware 132 may dynamically delete some of the existing elements, or may add new elements. Accordingly, the middleware 132 may omit some of the elements described in the various embodiments of the present disclosure, may further include other elements, or may replace the some of the elements with elements, each of which performs a similar function and has a different name.

The API 133 is a set of API programming functions, and may be provided with a different configuration according to an OS. In the case of Android or iOS, for example, one API set may be provided to each platform. In the case of Tizen, for example, two or more API sets may be provided to each platform.

The applications 134 may include, for example, a preloaded application and/or a third party application. The applications 134 may include, for example, a home application 1341, a dialer application 1342, a Short Message Service (SMS)/Multimedia Message Service (MMS) application 1343, an Instant Message (IM) application 1344, a browser application 1345, a camera application 1346, an alarm application 1347, a contact application 1348, a voice dial application, an electronic mail (e-mail) application 1345, a calendar application 1355, a media player application 1356, an album application 1357, a clock application 1358, and any other suitable and/or similar application.

At least a part of the programming module 300 may be implemented by instructions stored in a non-transitory computer-readable storage medium. When the instructions are executed by one or more processors (e.g., the one or more processors 120), the one or more processors may perform functions corresponding to the instructions. The non-transitory computer-readable storage medium may be, for example, the memory 130. At least a part of the programming module 300 may be implemented (e.g., executed) by, for example, the one or more processors 120. At least a part of the programming module 300 may include, for example, a module, a program, a routine, a set of instructions, and/or a process for performing one or more functions.

FIG. 4 is a signal flow chart that describes a method for displaying a user interface, between an electronic device 100 and a server 203, according to embodiments of the present invention.

Referring to FIG. 4, the electronic device 100 requests information about an item from the server 203 (401). The item may be related to contents such as books, videos (e.g., movies), music, applications, etc.

Requesting information about an item is requesting details about an item (e.g., for a content, the description, the seller, the type, the category, supporting operating systems (OSs), supporting languages, supporting devices, the version (update date), consumers' marks). For example, item information may include a thumbnail representing an item. In an embodiment of the present invention, the server 203 may be contents providers, e.g., Samsung Hub, Google Play, Google Store, Apple's App Store, Rim's BlackBerry World, Microsoft's Marketplace, etc.

The server 203 transmits the item information to the electronic device 100 according to the request (403).

The electronic device 100 displays the received item information, from the server 203 (405). At operation 405, the received item information is details about an item (e.g., for a content, the description, the seller, the type, the category, supporting operating systems (OSs), supporting languages, supporting devices, the version (update date), consumers' marks). For example, the received item information may include a thumbnail representing an item.

The electronic device 100 obtains preference information (407). The electronic device 100 may receive preference information from the user at operation 407. For example, the electronic device 100 may receive preference information according to a user's input signal at operation 407. An example of the preference information is a relative rating or a review about an item that is showing the details. Another example of the preference information is a preference indication a level of preference that the user prefers an item showing the details. Still another example of the preference information is favorites for an item showing the details. As an example, the method of receiving preference information by the electronic device 100 may include an operation of altering a thumbnail of an item in response to a user's input signal through a user input 140. As another example, the method of receiving preference information by the electronic device 100 may include an operation of receiving marks through a user input 140. As another example, the method of receiving preference information by the electronic device 100 may include an operation of displaying a user interface for allowing a user to decide ranking on the display unit 150 of the electronic device 100 and an operation of receiving a star rating according to a user's touch input.

The electronic device 100 transmits the received preference information to the server 203 (409). The electronic device 100 alters the image of an item according to the received preference information and displays it (411). For example, the electronic device 100 may alter a thumbnail of an item according to the received preference information and display it at operation 411. In an embodiment of the present invention, for an item with a relatively high level of preference that the user frequently sees or intuitively searches, the electronic device 100 alters the thumbnail of the item to be relatively large and displays it in a large thumbnail. Similarly, for an item with a relatively low level of preference, the electronic device 100 alters the thumbnail of the item to be relatively small and displays it in a small thumbnail.

The server 203 receives the preference information from the electronic device 100 and creates a database of preference information (413). The server 203 may also collect preference information from other electronic devices (e.g., electronic devices 201 and 202 shown in FIG. 2) as well as the electronic device 100. The server 203 may collect preference information from other electronic devices including the electronic device 100 and create a database based on the collected preference information.

The server 203 may alter the size of the images for items (e.g., thumbnails) according to the preference information in the database. When the server 203 receives a request for item information from the electronic device 100 at operation 401, it alters the thumbnail of the requested item according to the corresponding preference information in the database and transmits the altered thumbnail of the item as item information to the electronic device 100 at operation 403.

FIG. 5 is a signal flow chart that describes a method for displaying a user interface, between an electronic device 100 and a server 203, according to embodiments of the present invention.

Referring to FIG. 5, the electronic device 100 requests information about an item from the server 203 (501). The item may be related to contents such as books, videos (e.g., movies), music, applications, etc.

Requesting information about an item is requesting details about an item (e.g., for a content, the description, the seller, the type, the category, supporting operating systems (OSs), supporting languages, supporting devices, the version (update date), consumers' marks). For example, item information may include a thumbnail representing an item.

The server 203 transmits the item information to the electronic device 100 according to the request (503).

The electronic device 100 displays the received item information, from the server 203 (505). At operation 505, the received item information is details about an item (e.g., for a content, the description, the seller, the type, the category, supporting operating systems (OSs), supporting languages, supporting devices, the version (update date), consumers' marks). For example, the received item information may include a thumbnail representing an item.

The electronic device 100 obtains preference information (507). The electronic device 100 may receive preference information from the user at operation 507. For example, the electronic device 100 may receive preference information according to a user's input signal at operation 507. An example of the preference information is a relative rating about an item that is showing the details. Another example of the preference information is a preference indicating a level of preference that the user prefers an item showing the details. Still another example of the preference information is favorites for an item showing the details. As an example, the method of receiving preference information by the electronic device 100 may include an operation of altering a thumbnail of an item in response to a user's input signal through a user input 140. As another example, the method of receiving preference information by the electronic device 100 may include an operation of receiving marks through a user input 140. As another example, the method of receiving preference information by the electronic device 100 may include an operation of displaying a user interface for allowing a user to decide ranking on the display unit 150 of the electronic device 100 and an operation of receiving a star rating according to a user's touch input.

The electronic device 100 transmits the received preference information to the server 203 (509).

The server 203 receives the preference information from the electronic device 100 and creates a database of preference information (511). The server 203 may also collect preference information from other electronic devices (e.g., electronic devices 201 and 202 shown in FIG. 2) as well as the electronic device 100. The server 203 may collect preference information from other electronic devices including the electronic device 100 and create a database based on the collected preference information.

The server 203 may alter the size of the images for items (e.g., thumbnails) according to the preference information in the database.

The electronic device 100 requests a preference list from the server 203 (513). When the server 203 receives preference information about items, it lists items with preference information, creating a database. The server 203 transmits a list of items with preference information to the electronic device 100 according to the preference list request (515). An example of the preference list is a wish list. The wish list may be a list of goods or services that a user needs, by items. The wish list may indicate the purchase intention and the preference information about goods such as applications, services, software, etc. The server 203 transmits a preference list to the electronic device 100 according to the preference list request at operation 515. For example, the preference list, as size information about the thumbnails of items according to the preferences, may be transmitted to the electronic device 100. For example, for an item with a relatively high level of preference that the user frequently sees or intuitively searches, the server 203 transmits the item and information about the large-sized thumbnail thereof to the electronic device 100. Similarly, for an item with a relatively small level of preference, the server 203 transmits the item and information about the small-sized thumbnail thereof to the electronic device 100.

The electronic device 100 displays the received preference list (515). For example, the electronic device 100 may alter the thumbnail of the item and display it according to the preference list at operation 515. In an embodiment, for an item with a high level of preference on the preference list, the electronic device 100 alters the thumbnail of the item to be relatively large and displays it in a large thumbnail. Similarly, for an item with a relatively low level of preference on the preference list, the electronic device 100 alters the thumbnail of the item to be relatively small and displays it in a small thumbnail.

FIG. 6 is a diagram that describes a method for displaying a user interface of an electronic device according to embodiments of the present invention.

Referring to FIGS. 4 to 6, the electronic device 100 may display at least one of the items 601, 602, 603, 604, 605, 606, and 607 in thumbnails at operation 411 or 517. The electronic device 100 may alter the size of one or more thumbnails of items according to the preference information and display them. For example, the electronic device 100 may display an item with the highest level of preference (e.g., item 601) as preference information on the largest area on the display unit 150 at operation 411. Similarly, the electronic device 100 may display an item with the lowest level of preference (e.g., item 602) as preference information on the smallest area on the display unit 150 at operation 411.

The electronic device 100 may vary the extent of occupancy by a thumbnail of an item on the display unit 150 according to the preference information. For example, the electronic device 100 may vary the extent of occupancy by a thumbnail of an item on the display unit 150 in proportion to the preference information.

For example, for an item with the highest level of preference (e.g., item 601) according to the preference information based on the preference list, the electronic device 100 may allow it to occupy the largest screen area on the display unit 150 at operation 517. Similarly, for an item with the lowest level of preference (e.g., item 602) according to the preference information based on the preference list, the electronic device 100 may allow it to occupy the smallest screen area on the display unit 150 at operation 517.

FIG. 7 is a flow chart that describes a method for displaying a user interface of an electronic device 100 according to embodiments of the present invention. FIGS.

8A to 8C are diagrams that describe a method for displaying a user interface of an electronic device according to embodiments of the present invention.

Referring to FIGS. 7 and 8A to 8C, the electronic device 100 displays information about an item on the display unit 150 (701). The item may be related to contents such as books, videos (e.g., movies), music, applications, etc. As an example, displaying information about an item is displaying details about an item (e.g., for a content, the description, the seller, the type, the category, supporting operating systems (OSs), supporting languages, supporting devices, the version (update date), consumers' marks). As another example, displaying item information is displaying a thumbnail representing an item.

The electronic device 100 receives a user's first input signal (703). The electronic device 100 enters an operation to input preference information according to the user's first input signal (705). For example, the electronic device 100 may enter a preference information input mode according to a user's first input signal at operation 705. An example of the user's first input signal is a touch action applied to a thumbnail of an item. The electronic device 100 detects a touch event that occurred on the thumbnail of an item and receives the signal as a user's first input signal. For example, when a user applies a long press to a thumbnail of an item and the touch event thus occurs, the electronic device 100 may enter a preference information input mode. It should be understood that the electronic device 100 may also detect events that occurred according to a short press, a touch, a hovering gesture, a multi-touch, etc., and receive the signals as a user's first input signal.

The electronic device 100 receives a user's second input signal (707). The electronic device 100 alters the thumbnail of an item and the preference information according to the user's second input signal (709). An example of the user's second input signal is a touch and drag action applied to a thumbnail of an item. The electronic device 100 detects a touch event that occurred on the thumbnail of an item and receives the signal as a user's second input signal. For example, when a user applies a touch gesture such as a drag gesture to a thumbnail of an item and the touch event thus occurs, the electronic device 100 alters the thumbnail of the item according to the user's second input signal and also the preference information according to the user's second input signal. It should be understood that the electronic device 100 may also detect an event for a zoom-in/zoom-out function by multi-touches applied to a thumbnail of an item and receive the signal as a user's second input signal. When the electronic device 100 ascertains that the thumbnail of an item starts to enlarge from the size before receiving the user's second input signal, according to the user's second input signal, at operation 709, it alters the preference information about the item to a high level of preference. Similarly, when the electronic device 100 ascertains that the thumbnail of an item starts to reduce from the size before receiving the user's second input signal, according to the user's second input signal, at operation 709, it alters the preference information about the item to a low level of preference. The electronic device 100 may enlarge or reduce the thumbnail of an item in size according to a user's second input signal and display it at operation 709. The electronic device 100 displays the altered thumbnail of an item and the altered preference information (711). The electronic device 100 may also display the preference information in the form of a star rating or in the form of a thumb-up/thumb-down rating.

As shown in FIG. 8A, the electronic device 100 displays information about an item on the display unit 150. Displaying information about an item is displaying a thumbnail 801 representing an item. The item may be related to contents such as books, videos (e.g., movies), music, applications, etc. For example, displaying information about an item is displaying details about an item (e.g., for a content, the description, the seller, the type, the category, supporting operating systems (OSs), supporting languages, supporting devices, the version (update date), consumers' marks). The electronic device 100 receives a user's first input signal 802. The electronic device 100 enters an operation to input preference information according to the user's first input signal 802. For example, the electronic device 100 may enter a preference information input mode according to a user's first input signal at operation 802. An example of the user's first input signal 802 is a touch action applied to a thumbnail 801 of an item. The electronic device 100 detects a touch event that occurred on the thumbnail 801 of an item and receives the signal as a user's first input signal 802. For example, when a user applies a long press to a thumbnail of an item and the touch event thus occurs, the electronic device 100 may enter a preference information input mode. It should be understood that the electronic device 100 may also detect events that occurred according to a short press, a touch, a hovering gesture, a multi-touch, etc., and receive the signals as a user's first input signal 802.

As shown in FIG. 8B, the electronic device 100 receives a user's second input signal 803. The electronic device 100 alters the thumbnail 801 of an item and the preference information 805 according to the user's second input signal 803. An example of the user's second input signal 803 is a touch and drag action applied to a thumbnail of an item. The electronic device 100 detects a touch event that occurred on the thumbnail 801 of an item and receives the signal as a user's second input signal 803. For example, when a user applies a touch gesture such as a drag gesture to a thumbnail 801 of an item and the touch event thus occurs, the electronic device 100 alters the thumbnail 801 of the item according to the user's second input signal 803 and also the preference information according to the user's second input signal 803. It should be understood that the electronic device 100 may also detect an event for a zoom-in/zoom-out function by multi-touches applied to a thumbnail 801 of an item and receive the signal as a user's second input signal 803. When the electronic device 100 ascertains that the thumbnail of an item starts to enlarge from the size before receiving the user's second input signal 803, according to the user's second input signal 803, it alters the preference information about the item to a high level of preference. Similarly, when the electronic device 100 ascertains that the thumbnail of an item starts to reduce from the size before receiving the user's second input signal 803, according to the user's second input signal 803, it alters the preference information about the item to a low level of preference.

As shown in FIG. 8C, the electronic device 100 may enlarge or reduce the thumbnail 801 of an item in size according to a user's second input signal 803 and display it at operation 709. The electronic device 100 displays the altered thumbnail 801 of an item and the altered preference information 805. The electronic device 100 may also display the preference information in the form of a star rating or in the form of a thumb-up/thumb-down rating.

FIG. 9 is a flow chart that describes a method for displaying a user interface of an electronic device 100 according to embodiments of the present invention. FIGS. 10A to 10C are diagrams that describe a method for displaying a user interface of an electronic device 100 according to embodiments of the present invention.

Referring to FIGS. 9 and 10A to 10C, the electronic device 100 displays information about an item (901). At operation 901, displaying information about an item includes requesting g details about an item (e.g., for a content, the description, the seller, the type, the category, supporting operating systems (OSs), supporting languages, supporting devices, the version (update date), consumers' marks). For example, the item information may include a thumbnail representing an item.

The electronic device 100 may receive preference information at operation 903. For example, the electronic device 100 may receive preference information according to a user's input signal at operation 903. An example of the preference information is a relative rating about an item that is showing the details. Another example of the preference information is a preference indicating a level of preference that the user prefers an item showing the details. Still another example of the preference information is favorites for an item showing the details. As an example, the method of receiving preference information by the electronic device 100 may include an operation of altering a thumbnail of an item in response to a user's input signal through a user input 140. As another example, the method of receiving preference information by the electronic device 100 may include an operation of receiving marks through a user input 140. As another example, the method of receiving preference information by the electronic device 100 may include an operation of displaying a user interface for allowing a user to decide ranking on the display unit 150 of the electronic device 100 and an operation of receiving a star rating according to a user's touch input.

The electronic device 100 displays a preference list of one or more item thumbnails (905). An example of the preference list is a wish list. The wish list may be a list of goods or services that a user needs, by items. The wish list may indicate the purchase intention and the preference information about goods such as applications, services, software, etc. For example, the electronic device 100 may alter the item thumbnails according to the preference list and display the altered item thumbnails at operation 905. In an embodiment, for an item with a high level of preference on the preference list, the electronic device 100 alters the thumbnail of the item to be relatively large and displays it in a large thumbnail. Similarly, for an item with a relatively low level of preference on the preference list, the electronic device 100 alters the thumbnail of the item to be relatively small and displays it in a small thumbnail.

The electronic device 100 receives a user's input signal (907). The electronic device 100 alters the thumbnail of an item displayed on the preference list according to the user's input signal (909). An example of the user's input signal is a touch and drag action applied to a thumbnail of an item. The electronic device 100 detects a touch event that occurred on the thumbnail of an item and receives the signal as a user's input signal. For example, when a user applies a touch gesture such as a drag gesture to a thumbnail of an item and the touch event thus occurs, the electronic device 100 alters the thumbnail of the item according to the user's input signal and also the preference information according to the user's input signal. It should be understood that the electronic device 100 may also detect an event for a zoom-in/zoom-out function by multi-touches applied to a thumbnail of an item and receive the signal as a user's input signal.

The electronic device 100 obtains preference information based on the altered item thumbnail on the preference list (911). For example, when the electronic device 100 ascertains that the altered thumbnail of an item is greater than the previous size, it obtains the preference information about the item as a high level of preference. Similarly, when the electronic device 100 ascertains that the altered thumbnail of an item is less than the previous size, it obtains the preference information about the item as a low level of preference. The electronic device 100 displays the thumbnail of an item altered according to a user's input signal (913).

As shown in FIG. 10A, the electronic device 100 displays a preference list of one or more item thumbnails 1001, 1002, 1003, 1004, 1005, 1006 and 1007. An example of the preference list is a wish list. The wish list may be a list of goods or services that a user needs, by items. The wish list may indicate the purchase intention and the preference information about goods such as applications, services, software, etc. For example, the electronic device 100 may alter the item thumbnails 1001 to 1007 according to the preference list of one or more item thumbnails 1001 to 1007 and display the altered item thumbnails. In an embodiment, for an item with a high level of preference on the preference list, the electronic device 100 alters the thumbnail of the item to be relatively large and displays it in a large thumbnail. Similarly, for an item with a relatively low level of preference on the preference list, the electronic device 100 alters the thumbnail of the item to be relatively small and displays it in a small thumbnail. For example, for an item (e.g., item 1002) that has the highest level of preference as preference information on the preference list, the electronic device 100 may display it on the largest area on the display unit 150. Similarly, for an item (e.g., item 1001) that has the lowest level of preference as preference information on the preference list, the electronic device 100 may display it on the smallest area on the display unit 150.

As shown in FIGS. 10B and 10C, the electronic device 100 receives a user's input signal 1008. The electronic device 100 alters one or more item thumbnails 1001 to 1007 displayed on the preference list according to the user's input signal 1008. An example of the user's input signal 1008 is a touch and drag action applied to one or more item thumbnails 1001 to 1007. The electronic device 100 detects a touch event that occurred on one or more item thumbnails 1001 to 1007 and receives the signal as a user's input signal 1008. For example, when a user applies a touch gesture such as a drag gesture to one or more item thumbnails 1001 to 1007 and the touch event thus occurs, the electronic device 100 alters one or more item thumbnails 1001 to 1007 according to the user's input signal 1008 and also the preference information 1009 according to the user's input signal 1008. It should be understood that the electronic device 100 may also detect an event for a zoom-in/zoom-out function by multi-touches applied to a thumbnail of an item and receive the signal as a user's input signal 1008. For example, the electronic device 100 may alter the size of the thumbnail of an item 1001 on the preference list according to a user's input signal and also the preference information 1009 about the item according to a user's input signal. The electronic device 100 obtains preference information 1009 based on the altered item thumbnail on the preference list. For example, when the electronic device 100 ascertains that the altered thumbnail of an item is greater than the previous size, it obtains the preference information 1009 about the item as a high level of preference. Similarly, when the electronic device 100 ascertains that the altered thumbnail of an item is less than the previous size, it obtains the preference information 1009 about the item as a low level of preference.

FIG. 11 is a flow chart that describes a method for displaying a user interface of an electronic device 100 according to embodiments of the present invention. FIGS. 12A and 12B are diagrams that describe a method for displaying a user interface of an electronic device 100 according to embodiments of the present invention.

Referring to FIG. 11, the electronic device 100 displays one or more items in thumbnails on a list, called an item list (1101). The item may be related to contents such as books, videos (e.g., movies), music, applications, etc. The thumbnail of an item may be an image representing the item. The thumbnails of items on the item list may be the same in size.

The electronic device 100 alters one or more item thumbnails on the item list according to a user's input signal (1103). The electronic device 100 displays one or more altered item thumbnails on the item list (1105).

As shown in FIG. 12A, the electronic device 100 displays an item list of one or more item thumbnails 1201, 1202, 1203, 1204, 1205, 1206, 1207, 1208, 1209, 1210, 1211, 1212, 1213, 1214, 1215, 1216, 1217, 1218, 1219 and 1220. The item may be related to contents such as books, videos (e.g., movies), music, applications, etc. The thumbnail of an item may be an image representing the item. The item thumbnails 1201 to 1220 on the item list may be the same in size. The electronic device 100 alters one or more item thumbnails 1201 to 1220 on the item list according to a user's input signal 1230.

As shown in FIG. 12B, the electronic device 100 displays one or more altered item thumbnails 1201 to 1220 on the item list.

In the following description referring to FIG. 13 to FIGS. 18A to 18C, embodiments will be described that displays electronic documents, such as text messages, web documents, contents, photographs, etc., through the user interface of an electronic device, based on the preferences.

FIG. 13 is a flow chart that describes a method for displaying a user interface of an electronic device 100 according to embodiments of the present invention. FIGS. 14A to 14D are diagrams that describe a method for displaying a user interface of an electronic device 100 according to embodiments of the present invention.

Referring to FIG. 13 and FIGS. 14A to 14D, the electronic device 100 displays message bubbles (1301). The message bubble allows the user of the electronic device 100 to exchange text or images with the conversation partner. There are a number of applications providing message bubbles, e.g., SMS applications, IM applications, MMS applications, SNS applications such as ChatON, etc. The electronic device 100 may also display conversations (threaded conversations) between the user and the conversation partner on the message bubbles at operation 1301. In an embodiment, the message bubble may be an example of an electronic document.

The electronic device 100 alters the size of the message bubble according to a user's input signal (1303). For example, the electronic device 100 may alter the size of speech bubbles and the size of images and/or text included in the message bubble according to a user's input signal at operation 1303. The electronic device 100 may alter preference information according to a user's input signal at operation 1303. The electronic device 100 obtains the preference information about the conversation according to the altered size of the message bubble (1305). The electronic device 100 displays a message bubble collection view for the conversations from which the preference information is obtained (1307). The electronic device 100 detects a touch event that occurred on the message bubble and receives the signal as a user's input signal. For example, when a user applies a touch gesture such as a drag gesture to a message bubble and the touch event thus occurs, the electronic device 100 alters the size of the message bubble according to the user's input signal and also the preference information according to the user's input signal. It should be understood that the electronic device 100 may also detect an event for a zoom-in/zoom-out function by multi-touches applied to a message bubble and receive the signal as a user's input signal.

As shown in FIGS. 14A and 14B, the electronic device 100 displays one or more message bubbles 1401, 1402, 1403, 1404, 1405, and 1406. The electronic device 100 may display conversations between the user and the conversation partner on the message bubbles 1401 to 1406. The electronic device 100 may alter the size of the message bubbles according to a user's input signal. For example, the electronic device 100 may alter the size of the message bubble 1403 according to a user's input signal 1407. As shown in FIG. 14C, the electronic device 100 obtains the preference information 1407-1 about the conversation 1403-1 according to the altered message bubble size 1403. As shown in FIG. 14D, the electronic device 100 displays a message bubble collection view for the conversations, e.g., conversation 1403-1, from which the preference information 1407-1 is obtained.

FIG. 15 is a flow chart that describes a method for displaying a user interface of an electronic device 100 according to embodiments of the present invention. FIGS. 16A to 16C are diagrams that describe a method for displaying a user interface of an electronic device 100 according to embodiments of the present invention.

Referring to FIG. 15 and FIGS. 16A to 16C, the electronic device 100 displays contents on the display unit 150 (1501). Examples of the contents are web pages, digital books, etc. The electronic device 100 receives a user's input signal (1503), and clips off part of the contents displayed according to the user's input signal (1505). The electronic device 100 obtains preference information about the contents displayed according to the user's input signal (1507). In another embodiment, at operation 1507, the electronic device 100 may clip off part of the contents displayed according to the user's input signal and may simultaneously obtain the preference information about the contents. An example of the user's input signal is a touch and drag action applied to contents. The electronic device 100 detects a touch event that occurred on the displayed contents and receives the signal as a user's input signal. For example, when a user applies a touch gesture such as a drag gesture to contents and the touch event thus occurs, the electronic device 100 clips off part of the contents according to the user's input signal and also alters the preference information according to the user's input signal. It should be understood that the electronic device 100 may also detect an event for a zoom-in/zoom-out function by multi-touches applied to contents and receive the signal as a user's input signal. In an embodiment, the contents may be an example of an electronic document.

As shown in FIGS. 16A to 16C, the electronic device 100 displays contents on the display unit 150. Examples of the contents are web pages, digital books, etc. The electronic device 100 receives a user's input signal 1601. As shown in FIG. 16B, the electronic device 100 clips off part 1602 of the contents displayed according to the user's input signal 1601. As shown in FIG. 16C, the electronic device 100 obtains preference information 1603 about the contents displayed according to the user's input signal 1601. The electronic device 100 may clip off part of the contents displayed according to the user's input signal and may simultaneously obtain the preference information 1603 about the contents.

FIG. 17 is a flow chart that describes a method for displaying a user interface of an electronic device 100 according to embodiments of the present invention. FIGS. 18A to 18C are diagrams that describe a method for displaying a user interface of an electronic device 100 according to embodiments of the present invention.

Referring to FIG. 17 and FIGS. 18A to 18C, the electronic device 100 displays a photo gallery, e.g., an image gallery, (1701). The photo gallery collectively shows thumbnails of pictures and/or videos taken by the camera module 180 and/or thumbnails of images and/or videos transmitted from an external electronic device (e.g., electronic device 201 or server 203). Applications for displaying a photo gallery may include a photo gallery application and also a music album application including thumbnails for music albums. In an embodiment, the photo gallery or photos may be an example of an electronic document.

The electronic device 100 obtains a user's input signal (1703). For example, the electronic device 100 receives a user's input signal at operation 1703. The electronic device 100 alters the size of the thumbnails for photos and/or videos included in the photo gallery according to the user's input signal (1705). The electronic device 100 obtains the preference information according to the altered thumbnail size for the photos and/or videos (1707). An example of the user's input signal is a touch and drag action applied to a thumbnail for a photo and/or a video. The electronic device 100 detects a touch event that occurred on the thumbnail for a photo and/or a video and receives the signal as a user's input signal. For example, when a user applies a touch gesture such as a drag gesture to a thumbnail for a photo and/or a video and the touch event thus occurs, the electronic device 100 alters the size of the thumbnail according to the user's input signal. It should be understood that the electronic device 100 may also detect an event for a zoom-in/zoom-out function by multi-touches applied to a thumbnail for a photo and/or a video and receive the signal as a user's input signal.

As shown in FIGS. 18A to 18C, the electronic device 100 displays a photo gallery including thumbnails of one or more photos and/or videos, 1801, 1802, 1803, 1804, 1805, 1806, 1807, 1808, 1809, 1810, 1811, 1812, 1813, 1814, and 1815. For example, the photo gallery collectively shows one or more thumbnails 1801 to 1815 of pictures and/or videos taken by the camera module 180, and/or one or more thumbnails 1801 to 1815 of images and/or videos transmitted from an external electronic device (e.g., electronic device 201 or server 203). Applications for displaying a photo gallery may include a photo gallery application and also a music album application including thumbnails for music albums.

The electronic device 100 receives a user's input signal 1816. The electronic device 100 alters the size of one or more thumbnails for photos and/or videos included in the photo gallery, e.g., a thumbnail 1801, according to the user's input signal 1816. The electronic device 100 obtains the preference information according to the altered thumbnail size for the photos and/or videos, e.g., the thumbnail 1801.

FIG. 19 is a flow chart that describes a method for displaying a user interface of an electronic device 100 according to embodiments of the present invention. FIGS. 20A and 20B are diagrams that describe a method for displaying a user interface of an electronic device 100 according to embodiments of the present invention.

Referring to FIG. 19 and FIGS. 20A and 20B, the electronic device 100 displays images of applications (1901). The images of applications may be thumbnails representing the applications. For example, applications may be displayed in the form of items on the electronic device 100.

The electronic device 100 obtains a user's input signal (1903). For example, the electronic device 100 receives a user's input signal at operation 1903. The electronic device 100 alters the size of the images included in the applications according to the user's input signal (1905). The electronic device 100 obtains the preference information according to the application image size (1907). An example of the user's input signal is a touch and drag action applied to an application image. The electronic device 100 detects a touch event that occurred on the application image and receives the signal as a user's input signal. For example, when a user applies a touch gesture such as a drag gesture to an application image and the touch event thus occurs, the electronic device 100 alters the size of the application image according to the user's input signal. It should be understood that the electronic device 100 may also detect an event for a zoom-in/zoom-out function by multi-touches applied to an application image and receive the signal as a user's input signal.

As shown in FIGS. 20A and 20B, the electronic device 100 displays one or more application images 2001, 2002, 2003, 2004, 2005, 2006, 2007, 2008 and 2009. The electronic device 100 receives a user's input signal 2100. The electronic device 100 alters the size of one or more application images, e.g., 2001, according to the user's input signal 2100. The electronic device 100 obtains the preference information according to the altered application image size 2001.

FIG. 21 is a flow chart that describes a method for displaying a user interface of an electronic device 100 according to embodiments of the present invention. FIGS. 22A and 22B are diagrams that describe a method for displaying a user interface of an electronic device 100 according to embodiments of the present invention.

Referring to FIG. 21 and FIGS. 22A and 22B, the electronic device 100 displays images of contacts (2101). The contact image may include one or more phone numbers of incoming calls/outgoing calls to/from the electronic device 100, names included in the contact, and times of incoming calls/outgoing calls. For example, the contact may be an electronic document.

The electronic device 100 obtains a user's input signal (2103). For example, the electronic device 100 receives a user's input signal at operation 2103. The electronic device 100 alters the size of the contact images according to the user's input signal (2105). The electronic device 100 obtains the preference information according to the contact image size (2107). An example of the user's input signal is a touch and drag action applied to a contact image. The electronic device 100 detects a touch event that occurred on the contact image and receives the signal as a user's input signal. For example, when a user applies a touch gesture such as a drag gesture to a contact image and the touch event thus occurs, the electronic device 100 alters the size of the contact image according to the user's input signal. It should be understood that the electronic device 100 may also detect an event for a zoom-in/zoom-out function by multi-touches applied to a contact image and receive the signal as a user's input signal.

As shown in FIGS. 22A and 22B, the electronic device 100 displays one or more contact images 2201, 2203, 2205 and 2207. The contact image may include one or more phone numbers of incoming calls/outgoing calls to/from the electronic device 100, names included in the contact, and times of incoming calls/outgoing calls. The electronic device 100 receives a user's input signal 2205. The electronic device 100 alters the size of one or more contact images, e.g., 2201, according to the user's input signal 2205. The electronic device 100 obtains the preference information according to the altered contact image size 2201. Since the electronic device 100 ascertains that the larger the altered contact image 2201 the higher the level of preference, it may display the phone number of an incoming call or an outgoing call, a name included in the contact, and a time of the incoming call/outgoing call and may further display information related to the contact. For example, while the electronic device 100 alters the size of one or more contact images, e.g., 2201, according to a user's input signal 2205, it may further display a photo 2209 related to the contact.

FIG. 23 is a flow chart that describes a method for displaying a user interface of an electronic device 100 according to embodiments of the present invention. FIGS. 24A and 24B are diagrams that describe a method for displaying a user interface of an electronic device 100 according to embodiments of the present invention.

Referring to FIG. 23 and FIGS. 24A and 24B, the electronic device 100 displays a map image (2301). The map image may be a photo of a region, taken by satellites or avionic systems, in a satellite view or in a map view. It should be understood that the present invention is not limited to types of maps. For example, the map may be an electronic document.

The electronic device 100 obtains a user's input signal (2303). For example, the electronic device 100 receives a user's input signal at operation 2303. The electronic device 100 clips off part of the map image according to the user's input signal (2305). The electronic device 100 obtains the preference information according to the clipped map image size (2307). An example of the user's input signal is a touch and drag action applied to a map image. The electronic device 100 detects a touch event that occurred on the map image and receives the signal as a user's input signal. For example, when a user applies a touch gesture such as a drag gesture to a map image and the touch event thus occurs, the electronic device 100 alters the size of the map image to be clipped off according to the user's input signal. It should be understood that the electronic device 100 may also detect an event for a zoom-in/zoom-out function by multi-touches applied to a map image and receive the signal as a user's input signal.

As shown in FIGS. 24A and 24B, the electronic device 100 displays a map image 2401. The electronic device 100 receives one or more user's input signals 2411 and 2412 on the map image 2401. The electronic device 100 clips off parts 2403 and 2405 of the map image according to the user's input signals 2411 and 2412 as shown in FIG. 24A and displays them as shown in FIG. 24B. The electronic device 100 obtains the preference information according to the size of the clipped map images 2403 and 2405. The electronic device 100 may conclude that the larger the size of the clipped map images 2403 and 2405 the higher the level of preference.

As described above, the user interface display method and the electronic device according to the present invention change the display of electronic documents and/or items on a list or in a thumbnail view based on the user's preferences, so that the user can intuitively use services of the electronic device.

Although exemplary embodiments of the invention have been described in detail above, it should be understood that many variations and modifications of the basic inventive concept herein described, which may be apparent to those skilled in the art, will still fall within the spirit and scope of the exemplary embodiments of the invention as defined in the appended claims.

The invention claimed is:

1. A method of displaying a user interface on an electronic device comprising:
    displaying one or more images;
    obtaining preference information, the preference information including a preference rating associated with the one or more images, the preference information being obtained by altering, with a user input, a size of a displayed image to a size corresponding to the preference rating;
    storing the obtained preference information including the preference rating; and
    altering the images according to the obtained preference information according to the preference information and displaying the altered images.

2. The method of claim 1, wherein the images comprise:
    information included in one or more items and documents.

3. The method of claim 1, wherein
    a higher preference rating corresponds to a larger altered size of the displayed image.

4. The method of claim 1, further comprising:
    displaying a preference list of one or more images altered according to the preference information;
    altering the images included in the preference list according to the user input;
    obtaining preference information according to the altered images included in the preference list; and
    displaying the altered images included in the preference list.

5. The method of claim 1, wherein displaying one or more images comprises;
    displaying one or more thumbnails on a list.

6. The method of claim 2, wherein:
    the documents comprise message bubbles; and
    the method further comprises:
        altering size of the message bubbles according to the user input;
        obtaining the preference information about contents included in the message bubbles according to the altered message bubble size; and
        displaying the message bubbles about which the preference information is obtained in a collection view.

7. The method of claim 2, wherein:
    the documents comprise contents; and
    the method further comprises:
        clipping off part of the contents according to the user input; and
        obtaining the preference information according to the size of the clipped contents.

8. The method of claim 2, wherein:
    the documents comprise a photo gallery including one or more photos; and
    the method further comprises:
        altering the photos according to the user input; and
        obtaining preference information according to the altered photos.

9. The method of claim 2, wherein:
    the items comprise applications; and
    the method further comprises:
        altering images of the applications according to the user input; and
        obtaining preference information according to the altered application images.

10. The method of claim 2, wherein:
the documents comprise contacts; and
the method further comprises:
- altering images of the contacts according to the user input; and
- obtaining preference information according to the altered contact images.

11. The method of claim 2, wherein:
the documents comprise a map; and
the method further comprises:
- clipping off part of the map according to the user input; and
- obtaining the preference information according to size of the clipped map.

12. An electronic device comprising:
a display unit;
a user input unit; and
a processor,
wherein the processor displays one or more images on the display unit, obtains preference information through the user input unit, alters the images according to the obtained preference information and displays the altered images on the display unit,
wherein the preference information includes a preference rating associated with the one or more images, and
wherein the preference information is obtained by altering, with a user input, a size of a displayed image to a size corresponding to the preference rating.

13. The electronic device of claim 12, wherein the images comprises:
information included in one or more items and documents.

14. The electronic device of claim 12, wherein a higher preference rating corresponds to a larger altered size of the displayed image.

15. The electronic device of claim 12, wherein the processor displays a preference list of one or more images altered according to the preference information on the display unit, alters the images included in the preference list according to the user input, obtains preference information according to the altered images included in the preference list, and displays the altered images included in the preference list.

16. The electronic device of claim 12, wherein:
the images are thumbnails; and
the processor displays information about items on a list of thumbnails.

17. The electronic device of claim 13, wherein:
the documents comprise message bubbles; and
the processor: alters size of the message bubbles according to the user input; obtains the preference information about contents included in the message bubbles according to the altered message bubble size; and displays the message bubbles about which the preference information is obtained on the display unit in a collection view.

18. The electronic device of claim 13, wherein:
the documents comprise contents; and
the processor: clips off part of the contents according to the user input; and obtains the preference information according to the size of the clipped contents.

19. The electronic device of claim 13, wherein:
the documents comprise a photo gallery including one or more photos; and
the processor: alters the photos according to the user input; and obtains preference information according to the altered photos.

20. The electronic device of claim 13, wherein:
the items comprise applications; and
the processor: alters images of the applications according to the user input; and obtains preference information according to the altered application images.

21. The electronic device of claim 13, wherein:
the documents comprise contacts; and
the processor: alters images of the contacts according to the user input; and obtains preference information according to the altered contact images.

22. The electronic device of claim 13, wherein:
the documents comprise a map; and
the processor: clips off part of the map according to the user input; and obtains the preference information according to size of the clipped map.

* * * * *